United States Patent
Tanimura et al.

(10) Patent No.: US 8,116,635 B2
(45) Date of Patent: Feb. 14, 2012

(54) POLARIZATION MULTIPLEXING AND TRANSMITTING APPARATUS

(75) Inventors: Takahito Tanimura, Kawasaki (JP); Takeshi Hoshida, Kawasaki (JP); Hisao Nakashima, Kawasaki (JP); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 713 days.

(21) Appl. No.: 12/155,262

(22) Filed: May 30, 2008

(65) Prior Publication Data

US 2009/0060508 A1 Mar. 5, 2009

(30) Foreign Application Priority Data

Aug. 31, 2007 (JP) ................................. 2007-226940

(51) Int. Cl.
*H04B 10/08* (2006.01)

(52) U.S. Cl. .......................... 398/184; 398/186; 398/201

(58) Field of Classification Search .................... 398/65, 398/152, 184–185, 201–202
See application file for complete search history.

(56) References Cited

U.S. PATENT DOCUMENTS

| | | | |
|---|---|---|---|
| 5,111,322 A | 5/1992 | Bergano | |
| 5,926,297 A | 7/1999 | Ishikawa | |
| 6,580,535 B1 | 6/2003 | Schönfelder | |
| 2004/0208646 A1* | 10/2004 | Choudhary et al. | 398/188 |

FOREIGN PATENT DOCUMENTS

| | | |
|---|---|---|
| JP | 5-136761 | 6/1993 |
| JP | 10-79705 | 3/1998 |
| JP | 11-55221 | 2/1999 |

OTHER PUBLICATIONS

D. van den Borne et al., "1.6-b/s/Hz Spectrally Efficient Transmission Over 1700 km of SSMF Using 40×85.6-Gb/s POLMUX-RZ-DQPSK", Journal of Lightwave Technology, vol. 25, No. 1, Jan. 2007, pp. 222-232.
Japanese Office Action issued Sep. 28, 2011 in corresponding Japanese Patent Application 2007-226940.

* cited by examiner

*Primary Examiner* — Leslie Pascal
(74) *Attorney, Agent, or Firm* — Staas & Halsey LLP

(57) ABSTRACT

A polarization multiplexing and transmitting apparatus generates polarization multiplexed light by multiplexing modulated signal components that having varying intensities and are in polarization states orthogonal to each other. The polarization multiplexing and transmitting apparatus includes a converting unit that converts light generated by a light source into signal components having a varying intensity synchronized with a clock signal input thereto and a varying intensity inversely synchronized with the clock signal, respectively; a modulating unit that modulates the signal components, respectively; and a polarization adjusting unit that orthogonalizes polarization states of the signal components.

20 Claims, 13 Drawing Sheets

POLARIZATION MULTIPLEXING AND TRANSMITTING APPARATUS

CROSS-REFERENCE TO RELATED APPLICATIONS

This application is based upon and claims the benefit of priority from the prior Japanese Patent Application No. 2007-226940, filed on Aug. 31, 2007, the entire contents of which are incorporated herein by reference.

BACKGROUND OF THE INVENTION

1. Field of the Invention

The present invention relates to a polarization multiplexing and transmitting apparatus that generates polarization multiplexed light.

2. Description of the Related Art

In recent years, the realization of high capacity optical communication systems has been demanded to cope with the increase in information transmitted through a network. As a technique to accomplish such, multiplexing (MUX) that utilizes polarization, a physical quantity of light, is examined. Polarization multiplexing is performed by using a coupler to couple two light components having polarization states orthogonal to each other.

FIG. 14 is a conceptual view of light subjected to polarization multiplexing. As shown in FIG. 14, axes H and V represent a horizontal direction and a vertical direction orthogonal to each other. Polarization multiplexed light 1400 includes a horizontal signal component 1410 and a vertical signal component 1420, each having a varying intensity. Here, time-aligned polarization multiplexing where timings of the signal component 1410 having a varying intensity and the signal component 1420 having a varying intensity are in-phase is performed. A "signal component having a varying intensity" is also called an "intensity-varying signal component".

FIG. 14 and the following explanation are based on the assumption that polarization multiplexed light is obtained by multiplexing components in a linearly polarization state orthogonal to each other. For example, a term "polarization direction" is used with respect to a polarization plane of linearly polarized light, and not only linearly polarized light but also elliptically polarized light or circularly polarized light may be actually used provided polarization states are orthogonal, and "polarization direction" should be read as "polarization state" in this case.

FIG. 15 is a conceptual view of light subjected to polarization multiplexing. As shown in FIG. 15, D. Van Den Borne, et. al., in "1.6-B/S/Hz Spectrally Efficient Transmission Over 1700 Km Of SSMF Using 40×85.6-Gb/S Pol. MUX-RZ-DQPSK", JLT, Vol. 25, No. 1, 2007, describes transmission that is resistant to non-linear noise of an optical fiber and based on time-interleaved polarization multiplexing where signal components 1410 and 1420, each having a varying intensity and included in the polarization multiplexed light 1400, are staggered by an amount corresponding to ½ of a pulse repetition cycle in terms of time.

FIG. 16 is a block diagram of a conventional polarization multiplexing and transmitting apparatus. As shown in FIG. 16, a conventional polarization multiplexing and transmitting apparatus 1600 disclosed in the specification of a U.S. patent, U.S. Pat. No. 6,580,535, uses polarization adjusters 1621 and 1622 to orthogonalize polarization directions of respective signals having varying intensities output from optical senders 1611 and 1612 and also uses an optical adder 1630 to add these signals, thereby performing polarization multiplexing (see FIG. 14).

FIG. 17 is a block diagram of a conventional polarization multiplexing and transmitting apparatus. As shown in FIG. 17, a conventional polarization multiplexing and transmitting apparatus 1700 disclosed in the specification of a U.S. patent, U.S. Pat. No. 5,111,322, uses a splitter 1710 to split an RZ (Return-to-Zero) optical pulse stream output from a mode-locked laser 1710 (M.L.L.) into respective streams and modulators 1731 and 1732 (MOD.) to modulate the respective streams, and couples the modulated respective streams in a multiplexer 1740 (POL. SPLITTER), thereby effecting polarization multiplexing.

Here, a delay adjustment circuit 1750 is provided between the modulator 1731 and the multiplexer 1740, and the delay adjustment circuit 1750 is used to delay one of the respective streams for one pulse and thereby staggers the streams with respect to each other, thus executing time-interleaved polarization multiplexing (see FIG. 15). Here, the delay adjustment circuit 1750 is formed of plural mirrors that divert the passing respective streams while reflecting them.

However, as the conventional technology depicted in FIG. 16 provides for two optical senders (optical senders 1611 and 1612), two laser diodes (LD) to generate continuous wave light are also required. Therefore, this technology has a problem in that apparatus size and manufacturing cost increase. When continuous wave light generated by the LDs are converted into signals having varying intensities by an optical divider, the power of each signal having a varying intensity is attenuated to half of that of the continuous wave light. Therefore, this technology has a problem in that the power consumed to obtain a necessary power of a polarization multiplexed light doubles.

The conventional technology depicted in FIG. 17 has a problem in that apparatus size and manufacturing cost increase since the delay adjustment circuit 1750, which includes mechanically movable components, is provided. When modulation of polarization multiplexed light is performed in a bit rate variable mode to cope with various signal formats (e.g., synchronous digital hierarchy (SDH), optical transport network (OTN), or Ether), a time-lag of the respective streams must be adjusted according to a change in bit rate. When using the delay adjustment circuit 1750 to adjust the time-lag of the respective streams, this technology has a problem in that the configuration and control of the delay adjustment circuit 1750 are complicated.

To eliminate problems associated with conventional techniques, it is an object of the present invention to provide a polarization multiplexing and transmitting apparatus that can perform time-interleaved polarization must while reducing apparatus size.

SUMMARY OF THE INVENTION

It is an object of the present invention to at least solve the above problems in the conventional technologies.

A polarization multiplexing and transmitting apparatus according to one aspect of the present invention includes a converting unit that converts light generated by a light source into signal components having a varying intensity synchronized with a clock signal input thereto and a varying intensity inversely synchronized with the clock signal, respectively; a modulating unit that modulates the signal components, respectively; and a polarization adjusting unit that orthogonalizes polarization states of the signal components.

A polarization multiplexing and transmitting apparatus according to another aspect of the present invention includes an optical switch that distributes light generated by a light source to two paths at a rate according to a clock signal input thereto to be convert the light into signal components having varying intensities that are inverted with respect to each other; a modulating unit that modulates the signal components; a polarization adjusting unit that orthogonalizes polarization states of the signal components; and a multiplexing unit that performs polarization multiplexing with respect to the signal components modulated by the modulating unit and having the polarization states orthogonalized by the polarization adjusting unit.

A polarization multiplexing and transmitting apparatus according to yet another aspect of the present invention includes a polarization switch that, according to an input clock signal, changes a polarization state of light generated by a light source to a first polarization state and a second polarization state orthogonal to the first polarization state; a polarization beam splitter that separates the light having the polarization state changed by the polarization switch, into signal components that are respectively in the first polarization state and the second polarization state, and respectively have a varying intensity; a modulating unit that modulates the signal components; and a multiplexing unit that performs polarization multiplexing with respect to the signal components modulated by the modulating unit.

A polarization multiplexing and transmitting apparatus according to still another aspect of the present invention includes a splitter that splits light generated by a light into light components for output to two paths; a pulsing unit that pulses one of the light components in synchronization with a clock signal input thereto and pulses the other of the light components in inverse-synchronization with the clock signal; a modulating unit that modulates signal components having varying intensities pulsed by the pulsing unit; a polarization adjusting unit that orthogonalizes polarization states of the signal components with respect to each other; and a multiplexing unit that performs polarization multiplexing with respect to the signal components modulated by the modulating unit and having the polarization states orthogonalized by the polarization adjusting unit.

A polarization multiplexing and transmitting apparatus according to still another aspect of the present invention includes a polarization switch that, according to a clock signal input thereto, changes a polarization state of light generated by a light source to a first polarization state and a second polarization state orthogonal to the first polarization state; a first modulating unit that modulates a signal component that has a varying intensity, is in the first polarization state, and is in the light having the polarization state changed by the polarization switch; and a second modulating unit that is connected with the first modulating unit in series and modulates a signal component that has a varying intensity, is in the second polarization state, and is in the light having the polarization state changed by the polarization switch.

A polarization multiplexing and transmitting apparatus according to yet another aspect of the present invention includes a pulsing unit that, in synchronization with a clock signal input thereto, pulses light generated by a light source; a polarization adjusting unit that adjusts a polarization state of a signal component having a varying intensity and pulsed by the pulsing unit, to a combined state of a first polarization state and a second polarization state orthogonal to the first polarization state; a first modulating unit that modulates a signal component that has a varying intensity, is in the first polarization state, and is in the light that is pulsed by the pulsing unit and has the polarization state adjusted by the polarization adjusting unit; and a second modulating unit that is connected with the first modulating unit in series and modulates a signal component that has a varying intensity, is in the second polarization state, and is in the light that is pulsed by the pulsing unit and has the polarization state adjusted by the polarization adjusting unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
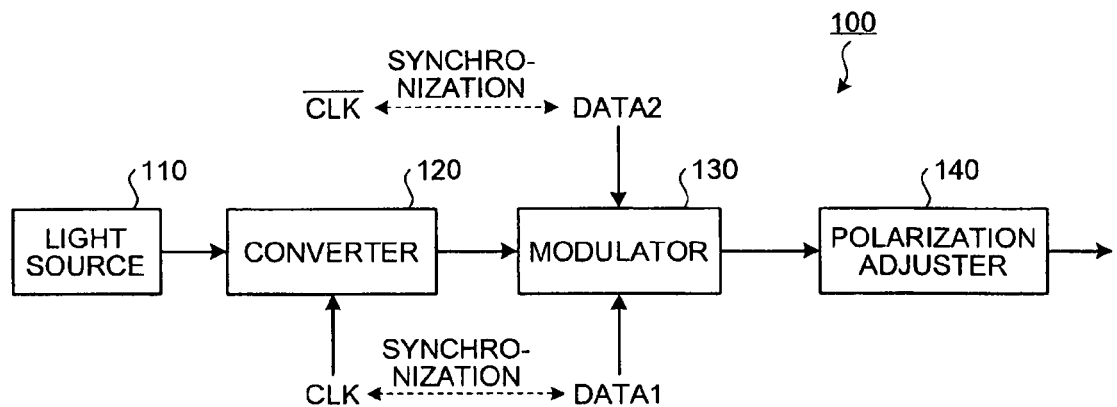
FIG. 1 is a block diagram of a polarization multiplexing and transmitting apparatus according to the present invention.

FIG. 1 is a block diagram of a polarization multiplexing and transmitting apparatus according to the present invention. The polarization multiplexing and transmitting apparatus according to the present invention generates polarization multiplexed light by multiplexing respective modulated signal components having varying intensities and orthogonal polarization directions. As shown in FIG. 1, a polarization multiplexing and transmitting apparatus 100 includes a light source 110, a converter 120, a modulator 130, and a polarization adjuster 140.

The light source 110 generates and outputs polarized light to the converter 120. This polarized light may be continuous wave light or pulsed light. An example in which output from the light source 110 is continuous wave light will be explained. The light source 110 is, for example, an LD. The continuous wave light output from the light source 110 and a clock signal (CLK) are input to the converter 120. The clock signal input to the converter 120 is an alternating electrical signal periodically switching between "0" and "1" and having, for example, a sinusoidal wave, a triangular wave, or a rectangular wave.

The converter 120 converts the continuous wave light output from the light source 110 into an intensity-varying signal component that is synchronized with the input clock signal and an intensity-varying signal component that is inversely synchronized with the clock signal. The intensity-varying signal component synchronized with the clock signal is an intensity-varying signal component having an excitation timing that matches that of the clock signal. The intensity-varying signal component inversely synchronized with the clock signal is an intensity-varying signal component having an excitation timing that matches that of an inverted clock signal.

The intensity-varying signal component synchronized with the clock signal and the intensity-varying signal component inversely synchronized with the clock signal are two signal components having varying intensities and split to different paths. Alternatively, the intensity-varying signal component synchronized with the clock signal and the intensity-varying signal component inversely synchronized with the clock signal are two signal components having varying intensities and included in light transmitted through one path. The converter 120 outputs the respective converted signal components having varying intensities to the modulator 130.

The modulator 130 receives the respective signal components having varying intensities output from the converter 120 and, two data signals DATA1 and DATA2. The modulator 130 modulates the signal component having a varying intensity synchronized with the clock signal that is output from the converter 120, based on DATA 1 (first data signal). The modulator 130 also modulates the signal component having a varying intensity inversely synchronized with the clock signal and output from the converter 120, based on DATA 2 (second data signal).

For example, based on a clock signal synchronized with the clock signal input to the converter 120 and an inverted clock signal that is the former clock signal inverted, the modulator 130 synchronizes the timing of modulation and accordingly performs modulation on the respective signal components having varying intensities. The modulator 130 outputs the respective modulated signal components having varying intensities to the polarization adjuster 140. As a modulation mode of the modulator 130, various modulation modes, excluding polarizing modulation, such as intensity modulation, phase modulation, or frequency modulation can be used solely, or a combination thereof may be employed.

The polarization adjuster 140 orthogonalizes polarization directions of the respective signal components having varying intensities output from the modulator 130 with respect to each other. The polarization adjuster 140 is, for example, two polarization maintaining fibers. In this case, one polarization maintaining fiber allows one of the respective signal components having varying intensities to pass therethrough, and outputs the signal component having a varying intensity allowed to pass therethrough while maintaining a polarization direction of this signal component in a horizontal direction. The other polarization maintaining fiber allows the other signal component having a varying intensity to pass therethrough, and outputs the signal component having a varying intensity allowed to pass therethrough while maintaining a polarization direction of this signal component in a vertical direction.

The polarization adjuster 140 may be, for example, two polarizing elements. In this case, one polarizing element allows one of the respective signal components having varying intensities to pass therethrough, and allows a horizontal component alone of the passed signal component having a varying intensity to pass therethrough and be output. The other polarizing element allows the other of the respective signal components having varying intensities to pass therethrough, and allows a vertical component alone of the passed signal component having a varying intensity to pass therethrough and be output.

The polarization adjuster 140 may be a polarization switch that changes a polarization direction to a horizontal direction and a vertical direction. As the polarization switch, one that applies a voltage to a device to rapidly rotate input polarized light at a specific angle with reproducibility is known, for example. In this case, a horizontal component and a vertical component of continuous wave light having a polarization direction changed to the horizontal direction and the vertical direction by the polarization adjuster 140 are converted into signal components having varying intensities by the converter 120.

As a result, the polarization directions of the respective signal components having varying intensities output from the modulator 130 become orthogonal to each other, and the respective modulated signal components having varying intensities are output at timings having opposite signs. Since the respective signal components having varying intensities are inverted with respect to each other, polarization multiplexed light obtained by subjecting the respective signal components having varying intensities to polarization multiplexing is time-interleaved polarization multiplexed light. A configuration in which the polarization adjuster 140 is provided downstream from the converter 120 is explained here; however, the polarization adjuster 140 may be provided upstream from the converter 120, or the polarization adjuster 140 may be integrated with the converter 120.

As explained above, according to the polarization multiplexing and transmitting apparatus 100, conversion of continuous wave light into two signal components having varying intensities by the converter 120 enables generation of the respective signal components having varying intensities by using a single LD. Conversion of continuous wave light into two signal components that are inverted with respect to each other and having varying intensities enables staggering of the respective signal components having varying intensities with respect to each other in terms of time without using a delay adjustment circuit. Therefore, time-interleaved polarization multiplexing can be effected while reducing apparatus size.

Figure 2:
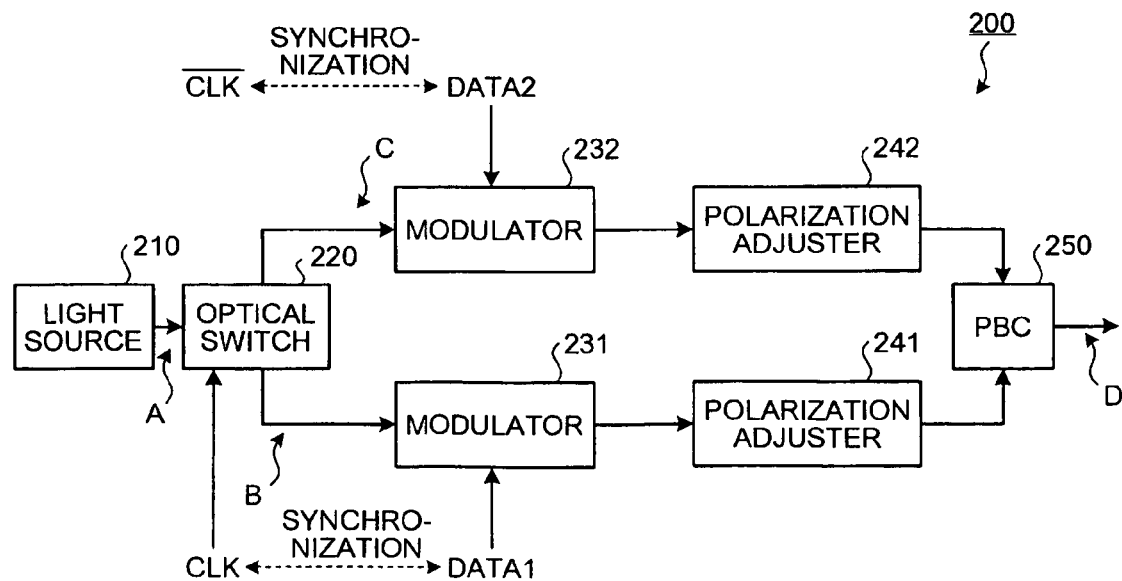
FIG. 2 is a block diagram of a polarization multiplexing and transmitting apparatus according to a first embodiment.

FIG. 2 is a block diagram of a polarization multiplexing and transmitting apparatus according to the first embodiment. As shown in FIG. 2, a polarization multiplexing and transmitting apparatus 200 includes a light source 210, an optical switch 220, modulators 231 and 232, polarization adjusters 241 and 242, and a polarization beam combiner 250 (PBC). The light source 210 is equivalent to the light source 110 depicted in FIG. 1. The light source 210 generates and outputs continuous wave light to the optical switch 220 (reference character A).

The optical switch 220 is equivalent to the converter 120 depicted in FIG. 1. The optical switch 220 receives the continuous wave light output from the light source 210 and a clock signal. The optical switch 220 distributes the continuous wave light output from the light source 210 to two paths at a rate according to the input clock signal. The two paths include a path connected with the modulator 231 and a path connected with the modulator 232, in this example.

Specifically, the optical switch 220 outputs, to the modulator 231, a light component having a power corresponding to the clock signal and included in the input continuous wave light (reference character B). The optical switch 220 outputs, to the modulator 232, a light component that is not output to the modulator 231 and included in the input continuous wave light (reference character C). As a result, the continuous wave light output from the light source 210 is converted into an intensity-varying signal component synchronized with the clock signal and an intensity-varying signal component inversely synchronized with the clock-signal.

The modulator 231 and the modulator 232 are equivalent to the modulator 130 depicted in FIG. 1. The modulator 231 receives DATA1 and the signal component having a varying intensity output from the optical switch 220. The modulator 231 modulates, based on DATA1, the signal component having a varying intensity output from the optical switch 220. The modulator 231 modulates the signal component having a varying intensity in synchronization with the clock signal. The modulator 231 outputs the modulated signal component having the changing intensity to the polarization adjuster 241.

The modulator 232 receives the signal component having a varying intensity output from the optical switch 220 and DATA2. The modulator 232 modulates the signal component having a varying intensity output from the optical switch 220 based on DATA2. The modulator 232 modulates the signal component having a varying intensity to be inversely synchronized with the clock signal. The modulator 232 outputs, to the polarization adjuster 242, the modulated signal component having a varying intensity.

The polarization adjusters 241 and 242 are equivalent to the polarization adjuster 140 depicted in FIG. 1. The polarization adjuster 241 and the polarization adjuster 242 adjust polarization directions of the respective signal components having varying intensities output from the modulator 231 and the modulator 232, thereby orthogonalizing the polarization directions of the respective signal components having varying intensities for input to the polarization beam combiner 250. A light component having a polarization direction in a horizontal direction will be referred to as a horizontal component and a light component having a polarization direction in a vertical direction will be referred to as a vertical component hereinafter.

The polarization adjusters 241 and 242 output the respective intensity-varying signal components having the adjusted polarization directions to the polarization beam combiner 250. The polarization beam combiner 250 combines the signal component having a varying intensity output from the polarization adjuster 241 with the signal component having a varying intensity-output from the polarization adjuster 242 to execute polarization multiplexing with respect to these signal components having varying intensities. The polarization beam combiner 250 outputs a polarization multiplexed light obtained by polarization multiplexing to an external device (reference character D).

Figure 3:
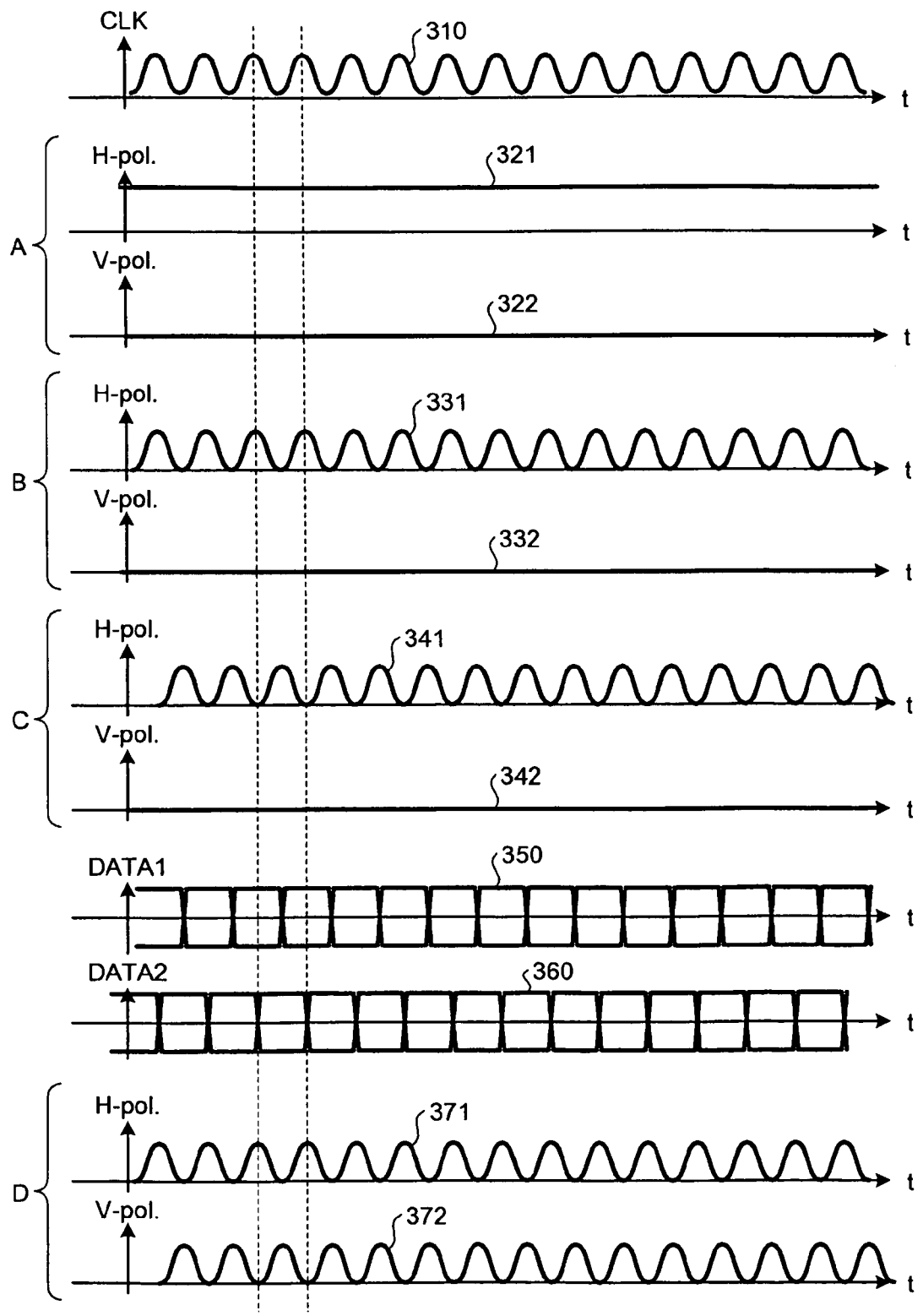
FIG. 3 is a time chart for the polarization multiplexing and transmitting apparatus according to the first embodiment.

FIG. 3 is a time chart for the polarization multiplexing and transmitting apparatus according to the first embodiment. In FIG. 3, an abscissa (t) represents a time common to lights or electrical signals at respective sections in the polarization multiplexing and transmitting apparatus 200 according to the first embodiment. A waveform 310 is indicative of the clock signal (CLK) input to the optical switch 220. H-pol. of an ordinate represents a horizontal component of a light. V-pol. represents a vertical component of a light.

Reference character A denotes waveforms (321 and 322) of the continuous wave light (see reference character A in FIG. 2) output from the light source 210 to the optical switch 220. The waveform 321 represents a horizontal component of the continuous wave light output from the light source 210. The waveform 322 represents a vertical component of the continuous wave light output from the light source 210. As represented by the waveform 321 and the waveform 322, the continuous wave light output from the light source 210 includes the horizontal component alone, i.e., does not include the vertical component.

Reference character B designates waveforms (331 and 332) of the signal component having a varying intensity (see reference character B in FIG. 2) output from the optical switch 220 to the modulator 231. The waveform 331 represents a horizontal component of the signal component having a varying intensity output to the modulator 231. The waveform 332 represents a vertical component of the signal component having a varying intensity output to the modulator 231. As represented by the waveform 331, the signal component having a varying intensity output to the modulator 231 is synchronized with the clock signal (see reference numeral 310).

Reference character C denotes waveforms (341 and 342) of a signal component having a varying intensity (see reference character C in FIG. 2) output from the optical switch 220 to the modulator 232. The waveform 341 represents a horizontal component of the signal component having a varying intensity output to the modulator 232. The waveform 342 represents a vertical component of the signal component having a varying intensity output to the modulator 241. As represented by the waveform 341, the signal component having a varying intensity output to the modulator 232 is inversely synchronized with the clock signal (see reference numeral 310).

A waveform 350 represents a waveform of DATA1 input to the modulator 231. As represented by the waveform 350, DATA1 input to the modulator 231 is input in synchronization with the clock signal (see reference numeral 310). A waveform 360 represents a waveform of DATA2 input to the modulator 232. As represented by the waveform 360, DATA2 input to the modulator 232 is input in synchronization with the clock signal (see reference numeral 310).

Reference character D designates waveforms (371 and 372) of the polarization multiplexed light (see reference character D in FIG. 2) output from the polarization beam combiner 250. The waveform 371 represents a horizontal component of the polarization multiplexed light output from the polarization beam combiner 250. The waveform 372 represents a vertical component of the polarization multiplexed light output from the polarization beam combiner 250.

Figure 15:
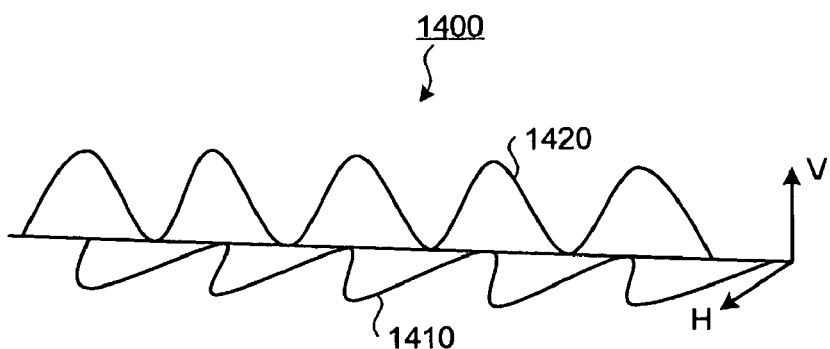
FIG. 15 is a conceptual view of light subjected to polarization multiplexing.
Figure 16:
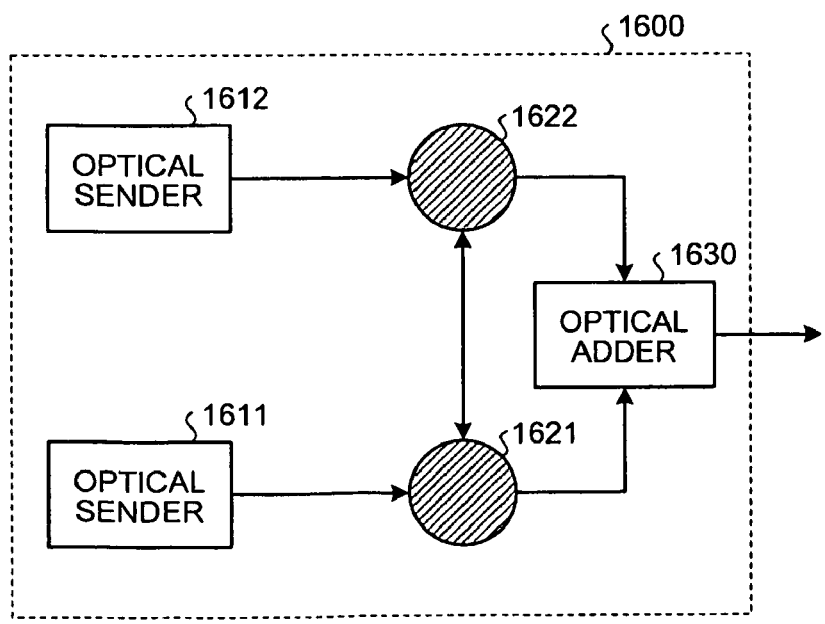
FIG. 16 is a block diagram of a conventional polarization multiplexing and transmitting apparatus.

As represented by the waveform 371 and the waveform 372, the horizontal component and the vertical component of the polarization multiplexed light output from the polarization beam combiner 250 become signal components that have a varying intensity and are inverted with respect to each other. Therefore, the polarization multiplexed light output from the polarization beam combiner 250 becomes time-interleaved polarization multiplexed light having a horizontal component and a vertical component that are staggered in terms of time (see FIG. 15).

Figure 4:
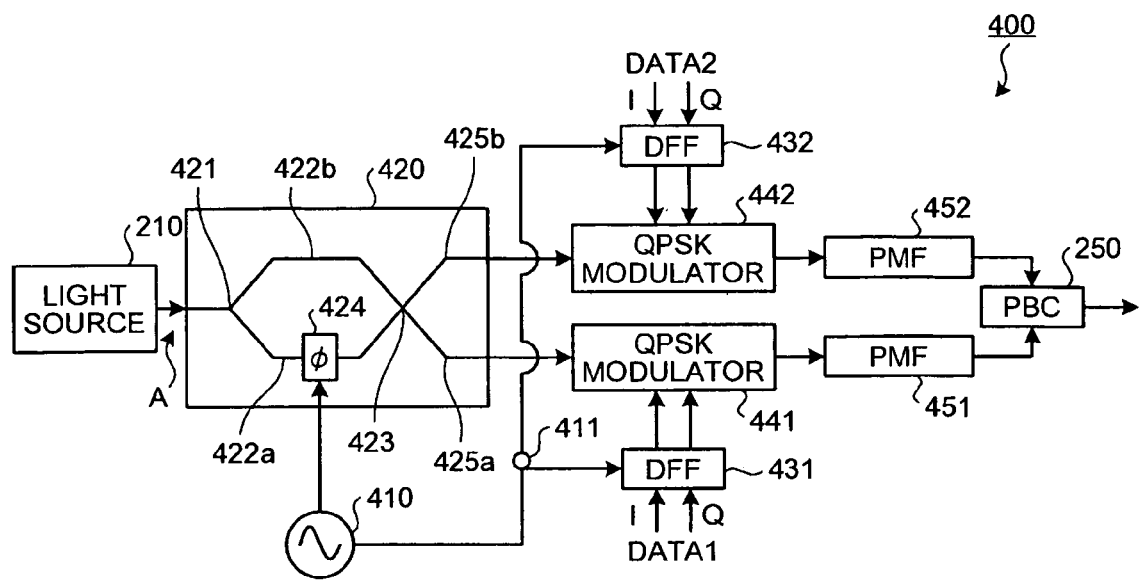
FIG. 4 is a block diagram of an example of the polarization multiplexing and transmitting apparatus according to the first embodiment.

FIG. 4 is a block diagram of an example of the polarization multiplexing and transmitting apparatus according to the first embodiment. In FIG. 4, like reference numerals denote structures identical to those depicted in FIG. 2, thereby omitting an explanation thereof. As shown in FIG. 4, a polarization multiplexing and transmitting apparatus 400 includes the light source 210, a clock oscillator 410, an inverting circuit 411, an optical switch 420, DFF circuits 431 and 432, phase modulators (QPSK modulators) 441 and 442, polarization maintaining fibers 451 and 452 (PMF), and the polarization beam combiner 250.

The light source 210 generates and outputs continuous wave light to the optical switch 420. The clock oscillator 410 generates a clock signal. The clock oscillator 410 outputs the generated clock signal to the optical switch 420, the DFF circuit 431, and the DFF circuit 432. The inverting circuit 411 is provided between the clock oscillator 410 and the DFF circuit 432, and inverts the clock signal output to the DFF circuit 432 from the clock oscillator 410, thereby providing an inverted clock signal.

The optical switch 420 is equivalent to the optical switch 220 depicted in FIG. 2. The optical switch 420 is a Mach-Zehnder type optical switch configured by providing a Mach-Zehnder type optical waveguide on an electro-optic substrate. The Mach-Zehnder type optical waveguide includes a splitter 421, parallel waveguides 422a and 422b, and a coupler 423. The splitter 421 splits the continuous wave light output from the light source 210.

The splitter 421 splits and outputs the continuous wave light to the parallel waveguides 422a and 422b. The parallel waveguides 422a and 422b respectively transmit the continuous wave light output from the splitter 421 to the coupler 423. A phase shifter 424 is provided in the parallel waveguide 422a. The phase shifter 424 changes a phase of the continuous wave light passing through the parallel waveguide 422a to 0 and π according to a clock signal output from the clock oscillator 410.

The coupler 423 couples the continuous wave light respectively output from the parallel waveguides 422a and 422b. The coupler 423 includes output units 425a and 425b. Light that has been coupled by the coupler 423 is distributed to the output unit 425a and the output unit 425b at a rate according to interference conditions. The coupler 423 is, for example, an optical coupler having two inputs and two outputs.

For example, when a phase difference of the continuous wave light respectively output to the coupler 423 is 0 and results in bright interference, all components of the light coupled by the coupler 423 are output from the output unit 425a. When the phase difference of the continuous wave light respectively output to the coupler 423 is π and results in dark interference, all components of the light coupled by the coupler 423 are output from the output unit 425b.

A phase of the continuous wave light output from the parallel waveguide 422a to the coupler 423 is changed to 0 and π according to the clock signal. On the other hand, a phase of the continuous wave light output from the parallel waveguide 422b to the coupler 423 is not changed according to the clock signal. Therefore, the phase difference of the continuous wave light respectively output to the coupler 423 is changed to 0 and π according to the clock signal.

Hence, the light coupled by the coupler 423 is distributed to the output unit 425a and the output unit 425b at a rate according to the clock signal. If the phase difference of the continuous wave light respectively output thereto becomes 0 when the clock signal is "1" and π when the clock signal is "0", a light component distributed to the output unit 425a becomes an intensity-varying signal component that is synchronized with the clock signal. A light component distributed to the output unit 425b becomes an intensity-varying signal component that is inversely synchronized with the clock signal.

The intensity-varying signal component that is synchronized with the clock signal is output to the phase modulator 441. The intensity-varying signal component that is inversely synchronized with the clock signal is output to the phase modulator 442. The delay flip flop (DFF) circuit 431 receives the clock signal output from the clock oscillator 410 and DATA1 (I, Q) that is a binary data signal. The DFF circuit 431 outputs DATA1 to the phase modulator 441 in synchronization with the input clock signal.

The DFF circuit 432 receives an inverted clock signal that is output from the clock oscillator 410 and inverted by the inverting circuit 411, and DATA2 (I, Q) that is a binary data signal. The DFF circuit 432 outputs DATA2 to the phase modulator 442 in synchronization with the input inverted clock signal. That is, the DFF circuit 432 outputs DATA2 to the phase modulator 442 in inverse-synchronization with the clock signal output from the clock oscillator 410.

The phase modulator 441 is equivalent to the modulator 231 depicted in FIG. 2. The phase modulator 441 receives a signal component having a varying intensity output from the optical switch 420 and DATA1 output from the DFF circuit 431. This signal component having a varying intensity and DATA1 are synchronized with the clock signal. The phase modulator 441 performs, based on DATA1, quadrature phase shift keying with respect to the signal component having a varying intensity and outputs an obtained result to the polarization maintaining fiber 451.

The phase modulator 442 is equivalent to the modulator 232 depicted in FIG. 2. The phase modulator 442 receives a signal component having a varying intensity output from the optical switch 420 and DATA2 output from the DFF circuit 432. This signal component having a varying intensity and DATA2 are inversely synchronized with the clock signal. The phase modulator 442 performs, based on DATA2, quadrature phase shift keying with respect to the signal component having a varying intensity and outputs a result to the polarization maintaining fiber 452.

The phase modulator 441 that performs quadrature phase shift keying (QPSK) is formed of, for example, two Mach-Zehnder type phase modulators that are connected in parallel and perform 0 and π phase modulations, and a phase shifter that changes a phase of a modulated light from one of these phase modulators by π/2. The phase modulator 442 can also perform quadrature phase shift keying based on the same configuration.

However, configurations of modulators that perform quadrature phase shift keying other than that explained above are also known, and any of such configuration can be adopted. The same circuit configuration can cope with differential quadrature phase shift keying (DQPSK). When the DFF circuits 431 and 432 are digital/analog (DA) converters, a configuration that can cope with quadrature or higher-value phase shift keying or quadrature amplitude modulation (QAM) can be provided. When output amplitudes of the DFF circuits 431 and 432 are insufficient with respect to necessary driving amplitudes of the phase modulators 441 and 442, a non-depicted driving amplification circuit may be provided to compensate this insufficiency.

The optical switch 420, the phase modulators 441 and 442 may be integrally provided on one electro-optic substrate. The polarization maintaining fibers 451 and 452 (PMF) are equivalent to the polarization adjusters 241 and 242 depicted in FIG. 2, respectively. The polarization maintaining fibers 451 and 452 maintain a state in which polarization directions of the respective signal components having varying intensities output from the phase modulator 441 and the phase modulator 442 are orthogonal to each other.

The configuration in which one of the parallel waveguides 422a and 422b constituting the optical switch 420 includes the phase shifter 424, is explained in the example depicted in FIG. 4. However, each of the respective parallel waveguides 422a and 422b may include the phase shifter to be driven based on a clock and an inverted clock. Although the configuration in which quadrature phase shift keying is performed, is explained in the example, intensity modulation, phase modulation, frequency modulation, or a combination thereof may be performed, and an intensity modulator or a frequency modulator may be used in place of the phase modulator in such a case.

The polarization maintaining fibers 451 and 452 output the respective signal components having varying intensities and maintained polarization directions in such a manner that these signal components are combined in an orthogonal polarization state by the polarization beam combiner 250. The polarization beam combiner 250 combines the respective signal components having varying intensities output from the polarization maintaining fiber 451 and the polarizing maintaining fiber 452, thereby effecting polarization multiplexing with respect to these signal components having varying intensities. The polarization beam combiner 250 outputs polarized multiplexed light to an external device outside.

Figure 17:
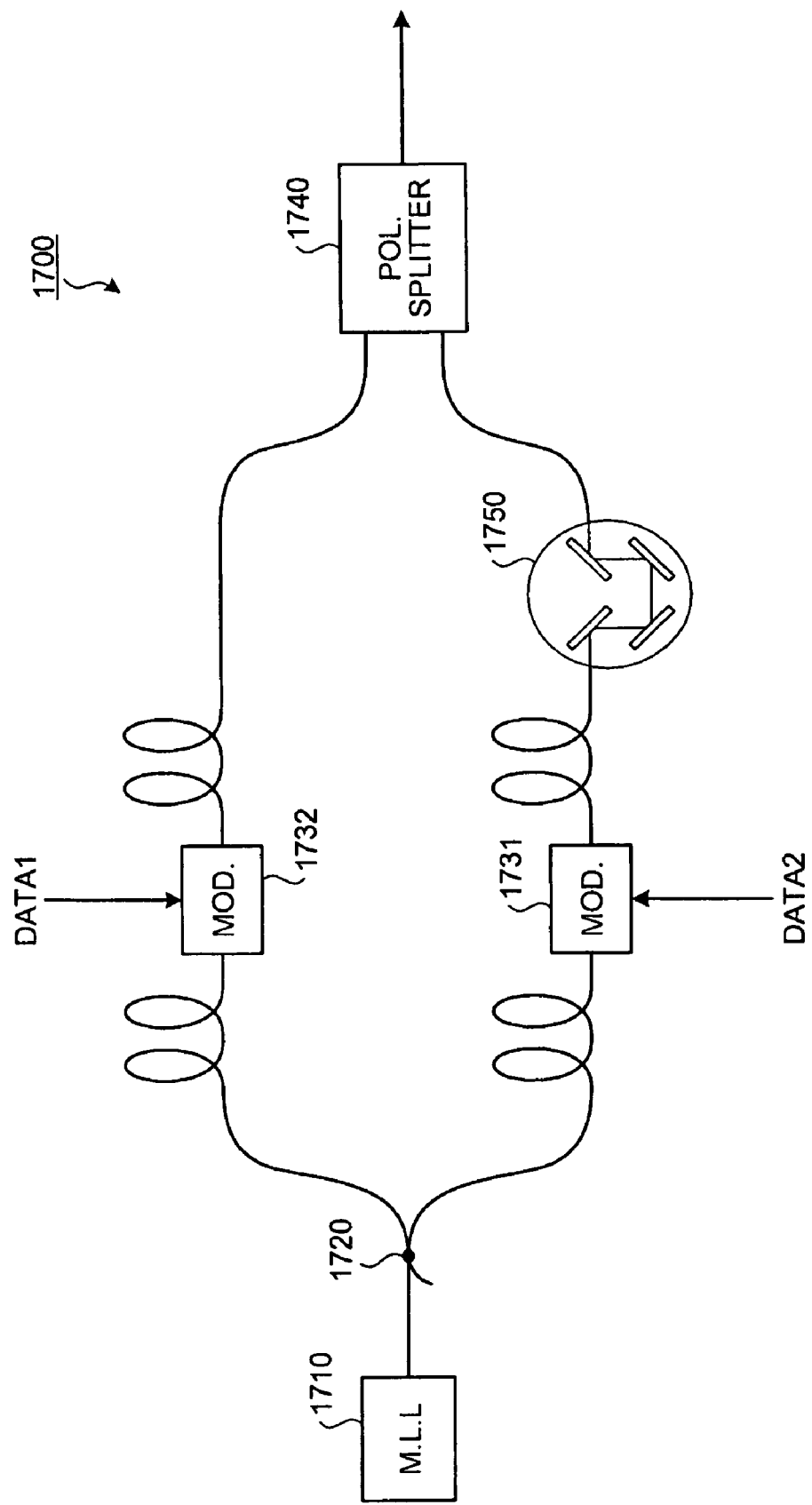
FIG. 17 is a block diagram of a conventional polarization multiplexing and transmitting apparatus.

As explained above, according to the polarization multiplexing and transmitting apparatus 200 of the first embodiment, converting the continuous wave light into the two signal components having varying intensities by using the optical switch 220 (optical switch 420) enables generation of the respective signal components having varying intensities by the single light source 210. Conversion of the continuous wave light into the two inverted signal components having varying intensities enables the respective signal components having varying intensities to be staggered with respect to each other in terms of time without use of the delay adjustment circuit (see reference numeral 1750 in FIG. 17). Therefore, time-interleaved polarization multiplexing can be executed while reducing apparatus size.

When the continuous wave light is separated into the two inverted signal components having varying intensities, the continuous wave light can be converted into the two signal components having varying intensities without being attenuated. Therefore, the power consumed to obtain a necessary power for a polarization multiplexed light can be reduced. For example, the polarization multiplexing and transmitting apparatus 200 can reduce power consumption to approximately ½ as compared with an example in which a continuous wave light is attenuated by an optical divider and converted into signal components having varying intensities.

When a bit rate of the clock signal is variable, polarization multiplexed light to be output can have a variable bit rate. Here, since the optical switch 220 outputs the respective signal components having varying intensities in a state in which these components are inverted with respect to each other, staggering of the respective signal components having varying intensities in terms of time does not have to be adjusted according to a change in bit rate. Therefore, simple configuration and control enable time-interleaved polarization multiplexing according to a variable bit rate.

Figure 5:
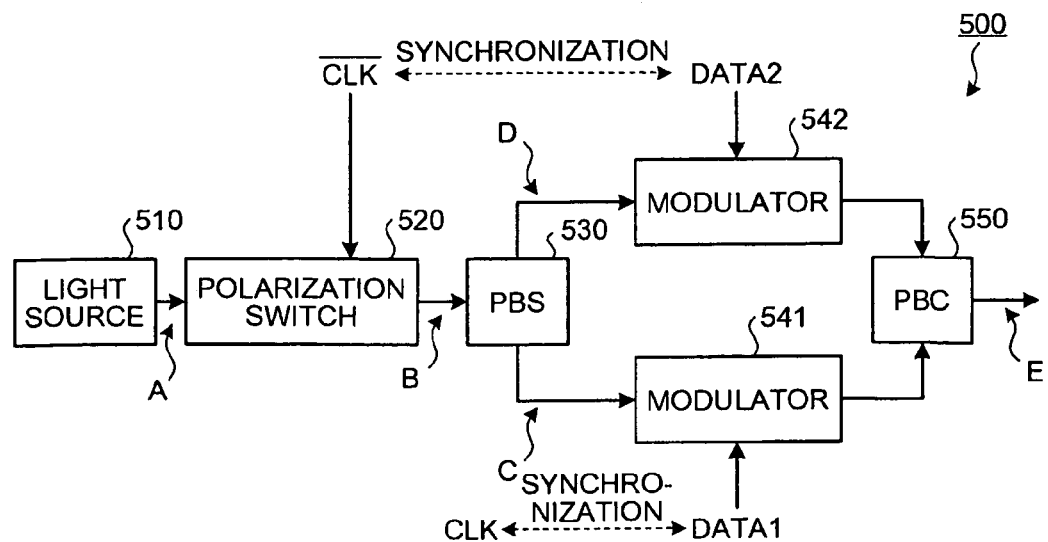
FIG. 5 is a block diagram of a polarization multiplexing and transmitting apparatus according to a second embodiment.

FIG. 5 is a block diagram of a polarization multiplexing and transmitting apparatus according to the second embodiment. As shown in FIG. 5, a polarization multiplexing and transmitting apparatus 500 according to the second embodiment includes a light source 510, a polarization switch 520, a polarization beam splitter 530 (PBS), a modulator 541, a modulator 542, and a polarization beam combiner 550. The light source 510 is equivalent to the light source 110 depicted in FIG. 1. The light source 510 generates and outputs continuous wave light to the polarization switch 520 (reference character A).

The polarization switch 520 and the polarization beam splitter 530 are equivalent to the converter 120 and the polarization adjuster 140 depicted in FIG. 1. The polarization switch 520 receives the continuous wave light output from the light source 510 and a clock signal. The polarization switch 520 changes a polarization direction of the continuous wave light output from the light source 510 to a horizontal direction (specific direction) and a vertical direction (direction orthogonal to the specific direction) according to the input clock signal.

The polarization switch 520 outputs the continuous wave light having the changed polarization direction to the polarization beam splitter 530 (reference character B). The polarization beam splitter 530 separates the continuous wave light output from the polarization switch 520 into a horizontal component and a vertical component. The polarization beam splitter 530 outputs the separated horizontal component to the modulator 541 (reference character C), and outputs the separated vertical component to the modulator 542 (reference character D).

The polarization direction of the continuous wave light output from the polarization switch 520 is changed to the horizontal direction and the vertical direction according to the clock signal. Therefore, respective light components output from the polarization beam splitter 530 become signal components having varying intensities that are inverted with respect to each other. Polarization directions of the respective signal components having varying intensities separated by the polarization beam splitter 530 are orthogonal to each other.

Assuming that the polarization direction of the continuous wave light becomes horizontal when the clock signal is "1" and the polarization direction of the continuous wave light becomes vertical when the clock signal is "0", the signal component having a varying intensity output from the polarization beam splitter 530 to the modulator 541 is an intensity-varying signal component that is synchronized with the clock signal. The light component output from the polarization beam splitter 530 to the modulator 542 is an intensity-varying signal component that is inversely synchronized with the clock signal.

The modulators 541 and 542 are equivalent to the modulator 130 depicted in FIG. 1. The modulator 541 receives the signal component having a varying intensity output from the polarization beam splitter 530 and DATA1. The modulator 541 modulates the signal component having a varying intensity output from the polarization beam splitter 530, based on DATA1. The modulator 541 modulates the signal component having a varying intensity in synchronization with the clock signal. The modulator 541 outputs the modulated signal component having a varying intensity to the polarization beam combiner 550.

The modulator 542 receives the signal component having a varying intensity output from the polarization beam splitter 530 and DATA2. The modulator 542 modulates the signal component having a varying intensity output from the polarization beam splitter 530, based on DATA2. The modulator 542 modulates the signal component having a varying intensity in inverse-synchronization with the clock signal. The modulator 542 outputs the modulated signal component having a varying intensity to the polarization beam combiner 550.

Polarization directions of the respective signal components having varying intensities input to the polarization beam combiner 550 become orthogonal to each other by operations of the polarization switch 520 and the polarization beam splitter 530. The polarization beam combiner 550 couples the signal component having a varying intensity output from the modulator 541 with the signal component having a varying intensity output from the modulator 542, thereby performing polarization multiplexing with respect to these signal components having varying intensities. The polarization beam combiner 550 outputs polarization multiplexed light to an external device (reference character E).

Figure 6:
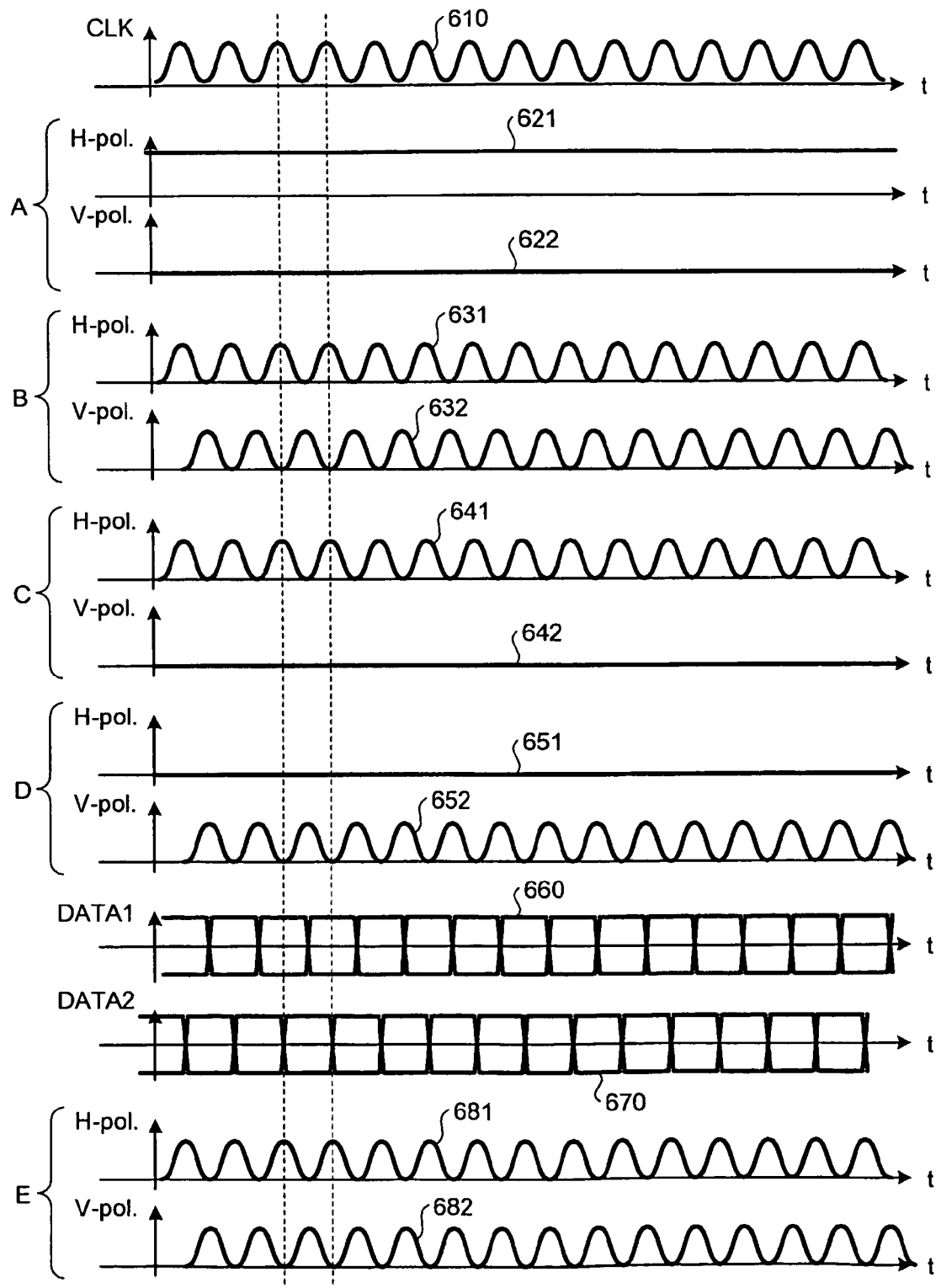
FIG. 6 is a time chart for the polarization multiplexing and transmitting apparatus according to the second embodiment.

FIG. 6 is a time chart for the polarization multiplexing and transmitting apparatus according to the second embodiment. In FIG. 6, an abscissa (t) represents a time common to lights or electrical signals at respective sections in the polarization multiplexing and transmitting apparatus 500. A waveform 610 is indicative of the clock signal (CLK) input to the polarization switch 520. H-pol. of an ordinate is indicative of a horizontal component of a light. V-pol. is indicative of a vertical component of a light.

Reference character A denotes waveforms (621 and 622) of the continuous wave light (see reference character A in FIG. 5) output from the light source 510 to the polarization switch 520. The waveform 621 represents a horizontal component of the continuous wave light output from the light source 510. The waveform 622 represents a vertical component of the continuous wave light output from the light source 510. As represented by the waveform 621 and the waveform 622, the continuous wave light output from the light source 510 includes the horizontal component alone, i.e., does not include the vertical component.

Reference character B designates waveforms (631 and 632) of the continuous wave light (see reference character B in FIG. 5) output from the polarization switch 520 to the polarization beam splitter 530. The waveform 631 and the waveform 632 represent a horizontal component and a vertical component of the continuous wave light output from the polarization switch 520, respectively. As represented by the waveform 631 and the waveform 632, the continuous wave light output from the polarization switch 520 includes the signal component having a varying intensity that is synchronized with the clock signal (see reference numeral 610) and the signal component having a varying intensity that is inversely synchronized with the clock signal.

Reference character C denotes waveforms (641 and 642) of the signal component having a varying intensity (see reference character C in FIG. 5) output from the polarization beam splitter 530 to the modulator 541. The waveform 641 represents a horizontal component of the signal component having a varying intensity output to the modulator 541. The waveform 642 represents a vertical component of the signal component having a varying intensity output to the modulator 541. As represented by the waveform 641, the signal component having a varying intensity output to the modulator 541 is synchronized with the clock signal (see reference numeral 610).

Reference character D designates waveforms (651 and 652) of the signal component having a varying intensity (see reference character D in FIG. 5) output from the polarization beam splitter 530 to the modulator 542. The waveform 651 represents a horizontal component of the signal component having a varying intensity output to the modulator 542. The waveform 652 represents a vertical component of the signal component having a varying intensity output to the modulator 542. As represented by the waveform 652, the signal component having a varying intensity output to the modulator 542 is inversely synchronized with the clock signal (see reference numeral 610).

A waveform 660 represents a waveform of DATA1 input to the modulator 541. As represented by the waveform 660, DATA1 input to the modulator 541 is input in synchronization with the clock signal (see reference numeral 610). A waveform 670 represents a waveform of DATA2 input to the modulator 542. As represented by the waveform 670, DATA2 input to the modulator 542 is input in inverse-synchronization with the clock signal (see reference numeral 610).

Reference character E designates waveforms (681 and 682) of the polarization multiplexed light (see reference character E in FIG. 5) output from the polarization beam combiner 550. The waveform 681 represents a horizontal component of the polarization multiplexed light output from the polarization beam combiner 550. The waveform 682 represents a vertical component of the polarization multiplexed light output from the polarization beam combiner 550.

As represented by the waveform 681 and the waveform 682, the horizontal component and the vertical component of the polarization multiplexed light output from the polarization beam combiner 550 become signal components inverted with respect to each other and having varying intensities. Therefore, the polarization multiplexed light output from the polarization beam combiner 550 becomes time-interleaved polarization multiplexed light having a horizontal component and a vertical component staggered with respect to each other in terms of time (see FIG. 15).

As explained above, according to the polarization multiplexing and transmitting apparatus 500 of the second embodiment, use of the polarization switch 520 and the polarization beam splitter 530 to convert the continuous wave light into the two signal components having varying intensities enables generation of the respective signal components having varying intensities by using the single light source 510. When the continuous wave light is converted into two signal components inverted with respect to each other and having varying intensities, the signal components having varying intensities can be staggered with respect each other in terms of time without using the delay adjustment circuit (see reference numeral 1750 in FIG. 17). Therefore, time-interleaved polarization multiplexing can be performed while reducing apparatus size.

Separation of the continuous wave light into the two signal components inverted with respect to each other and having varying intensities enables conversion into the two signal components having varying intensities without attenuation of the continuous wave light. Therefore, the power consumed to obtain a necessary power for the polarization multiplexed light can be reduced. For instance, the polarization multiplexing and transmitting apparatus 500 can reduce power consumption by approximately half as compared with an example in which the continuous wave light is attenuated by an optical divider for conversion into the signal components having varying intensities.

When a bit rate of the clock signal is variable, the polarization multiplexed light can have a variable bit rate. Here, since the polarization beam splitter 530 outputs the respective signal components having varying intensities in a state in which they are always inverted with respect to each other, temporal staggering of the respective signal components having varying intensities does not have to be adjusted according to a change in bit rate. Therefore, time-interleaved polarization multiplexing according to the variable bit rate can be executed based on a simple configuration and control.

The polarization directions of the respective signal components having varying intensities output from the polarization beam splitter 530 are always orthogonal to each other. Therefore, a polarization adjuster that adjusts the polarization directions of the respective signal components having varying intensities does not have to be provided, thereby further reducing apparatus size. The polarization adjuster that adjusts the polarization directions of the respective signal components having varying intensities may be provided to realize a configuration in which the polarization directions of the respective signal components having varying intensities input to the polarization beam combiner 550 are accurately orthogonalized.

Although not depicted, providing the polarization adjuster that adjusts polarization states of one or both of the respective signal components having varying intensities output from the polarization beam splitter 530 may enable realizing a configuration in which the polarization directions of the two signal components having varying intensities are once matched with each other and then these signal components are input to the modulators 541 and 542, for example. As this polarization adjuster, a polarization maintaining fiber or a birefringent plate may be used, for example. Adoption of such a configuration enables formation of the modulators 541 and 542 on the same substrate having an electro-optic effect.

Figure 7:
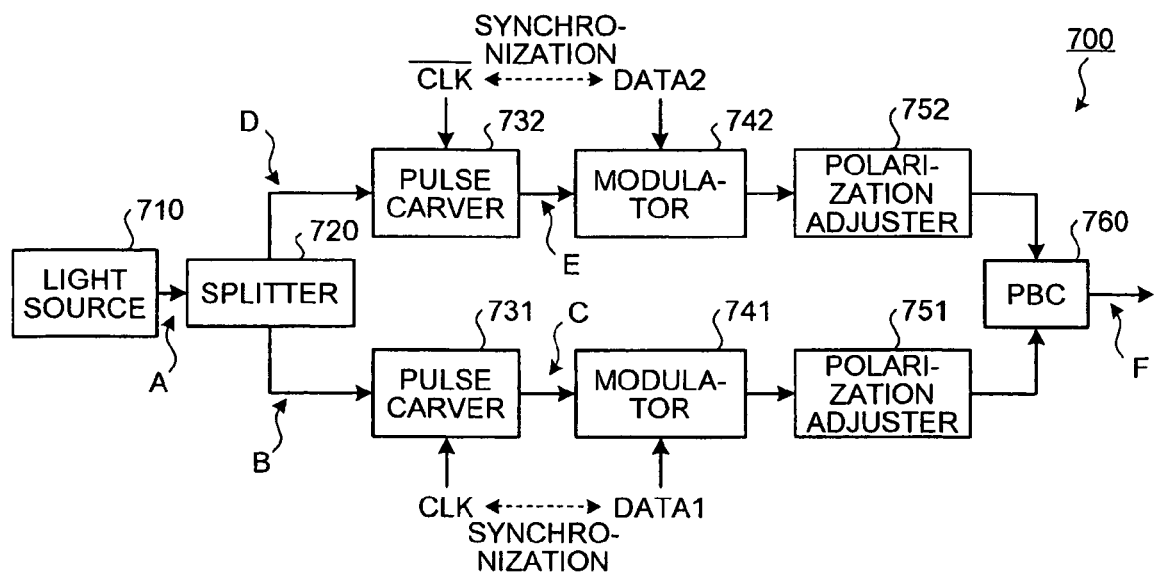
FIG. 7 is a block diagram of a polarization multiplexing and transmitting apparatus according to a third embodiment.

FIG. 7 is a block diagram of a polarization multiplexing and transmitting apparatus according to the third embodiment. As shown in FIG. 7, a polarization multiplexing and transmitting apparatus 700 according to the third embodiment includes a light source 710, a splitter 720, optical dividers 731 and 732 (pulse carvers, pulsing units), modulators 741 and 742, polarization adjusters 751 and 752, and a polarization beam combiner 760. The light source 710 is equivalent to the light source 110 depicted in FIG. 1.

The light source 710 generates and outputs continuous wave light to the splitter 720 (reference character A). The splitter 720, the optical divider 731, and the optical divider 732 are equivalent to the converter 120 depicted in FIG. 1. The splitter 720 splits the continuous wave light output from the light source 710 for output to the optical divider 731 (reference character B) and the optical divider 732 (reference character D).

The optical divider 731 receives the continuous wave light output from the splitter 720 and a clock signal. The optical divider 731 is a pulsing unit that pulses the continuous wave light output from the splitter 720 according to the clock signal to become a signal component having a varying intensity synchronized with the clock signal. The optical divider 731 outputs the pulsed signal component having a varying intensity to the modulator 741 (reference character C).

The optical divider 732 receives the continuous wave light output from the splitter 720 and an inverted clock signal obtained by inverting the clock signal. The optical divider 732 is a pulsing unit that pulses the continuous wave light output from the splitter 720 according to the inverted clock signal to be turned to a signal component having a varying intensity inversely synchronized with the clock signal. The optical divider 732 outputs the pulsed signal component having a varying intensity to the modulator 742 (reference character E).

The modulators 741 and 742 are equivalent to the modulator 130 depicted in FIG. 1. The modulator 741 receives the signal component having a varying intensity output from the optical divider 731 and DATA1. The modulator 741 modulates the signal component having a varying intensity output from the optical divider 731, based on DATA1. The modulator 741 also modulates the signal component having a varying intensity in synchronization with the clock signal. The modulator 741 outputs the modulated signal component having a varying intensity to the polarization adjuster 751.

The modulator 742 receives the signal component having a varying intensity output from the optical divider 732 and DATA2. The modulator 742 modulates the signal component having a varying intensity output from the optical divider 732, based on DATA2. The modulator 742 also modulates the signal component having a varying intensity in synchronization with an inverted clock signal obtained by inverting the clock signal. The modulator 742 outputs the modulated signal component having a varying intensity to the polarization adjuster 752.

The polarization adjusters 751 and 752 are equivalent to the polarization adjuster 140 depicted in FIG. 1. The polarization adjusters 751 and 752 adjust polarization directions of the respective signal components having varying intensities output from the modulator 741 and 742, respectively, to orthogonalize the polarization directions of the signal components having varying intensities input to the polarizing beam combiner 760.

The polarization adjusters 751 and 752 respectively output the respective signal components having varying intensities and adjusted polarization directions, to the polarization beam combiner 760. The polarization beam combiner 760 couples the signal component having a varying intensity output from the polarization adjuster 751 with the signal component having a varying intensity output from the polarization adjuster 752 to perform polarization multiplexing with respect to these signal components having varying intensities. The polarization beam combiner 760 outputs polarization multiplexed light obtained by polarization multiplexing to an external device (reference character F).

Figure 8:
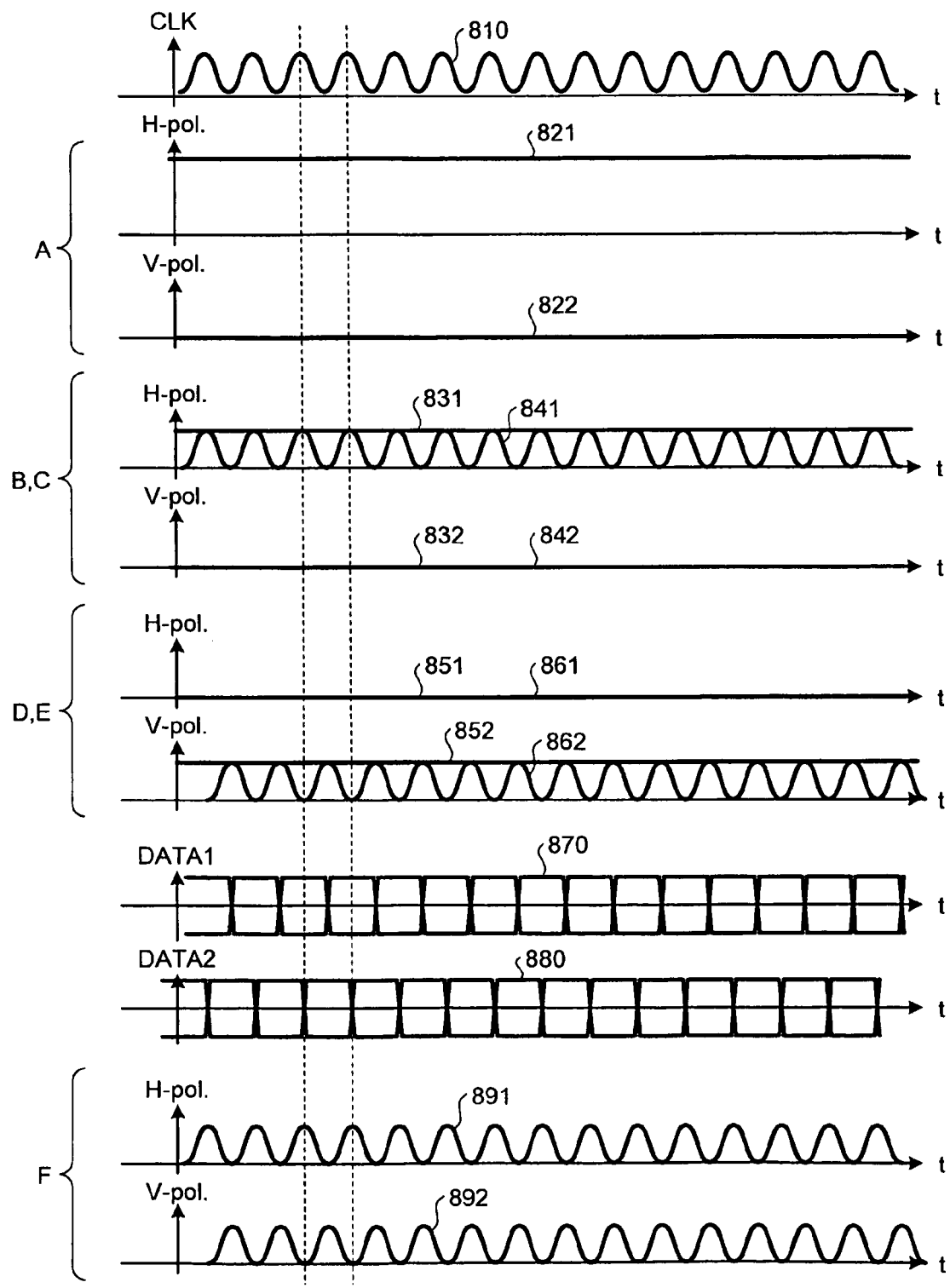
FIG. 8 is a time chart of the polarization multiplexing and transmitting apparatus according to the third embodiment.

FIG. 8 is a time chart of the polarization multiplexing and transmitting apparatus according to the third embodiment. In FIG. 8, an abscissa (t) represents a time common to lights or electrical signals at respective sections in the polarization multiplexing and transmitting apparatus 700 according to the third embodiment. A waveform 810 indicates the clock signal (CLK) input to the splitter 720. H-pol. of an ordinate indicates a horizontal component of a light. V-pol. indicates a vertical component of a light.

Reference character A denotes waveforms (821 and 822) of the continuous wave light (see reference character A in FIG. 7) output from the light source 710 to the splitter 720. The waveform 821 represents a horizontal component of the continuous wave light output from the light source 710. The waveform 822 represents a vertical component of the continuous wave light output from the light source 710. As represented by the waveform 821 and the waveform 822, the continuous wave light output from the light source 710 includes the horizontal component alone, i.e., does not include the vertical component.

Reference characters B and C designate waveforms (831 and 832) of the continuous wave light (see reference character B in FIG. 7) output from the splitter 720 to the optical divider 731 and waveforms (841 and 842) of the signal component having a varying intensity (see reference character C in FIG. 7) output from the optical divider 731 to the modulator 741, respectively. The waveform 831 and the waveform 832 represent a horizontal component and a vertical component of the continuous wave light output to the optical divider 731.

As represented by the waveform 831, the continuous wave light output to the optical divider 731 has a power that is ½ of that of the continuous wave light (see reference numeral 821) output from the light source 710. The waveform 841 and the waveform 842 represent a horizontal component and a vertical component of the signal component having a varying intensity output from the optical divider 731, respectively. As represented by the waveform 841, the signal component having a varying intensity output from the optical divider 731 is synchronized with the clock signal (see reference numeral 810).

Reference characters D and E designate waveforms (851 and 852) of the continuous wave light (see reference character D in FIG. 7) output from the splitter 720 to the optical divider 732 and waveforms (861 and 862) of the signal component having a varying intensity (see reference character E in FIG. 7) output from the optical divider 732 to the modulator 742, respectively. The waveform 851 and the waveform 852 represent respectively a horizontal component and a vertical component of the continuous wave light output to the optical divider 732.

As represented by the waveform 852, the continuous wave light output to the optical divider 732 has a power that is ½ of that of the continuous wave light (see reference numeral 821) output from the light source 710. The waveform 861 and the waveform 862 represent a horizontal component and a vertical component of the signal component having a varying intensity output from the optical divider 732, respectively. As represented by the waveform 862, the signal component having a varying intensity output from the optical divider 761 is inversely synchronized with the clock signal (see reference numeral 810).

The waveform 870 represents a waveform of DATA1 input to the modulator 741. As represented by the waveform 870, DATA1 input to the modulator 741 is input in synchronization with the clock signal (see reference numeral 810). The waveform 880 represents a waveform of DATA2 input to the modulator 742. As represented by the waveform 880, DATA2 input to the modulator 742 is input in inverse-synchronization with the clock signal (see reference numeral 810).

Reference numeral F denotes waveforms (891 and 892) of the polarization multiplexed light (see reference character F in FIG. 7) output from the polarization beam combiner 760. The waveform 891 represents a horizontal component of the polarization multiplexed light output from the polarization beam combiner 760. The waveform 892 represents a vertical component of the polarization multiplexed light output from the polarization beam combiner 760.

As represented by the waveform 891 and the waveform 892, the horizontal component and the vertical component of the polarization multiplexed light output from the polarization beam combiner 760 become signal components that are inverted with respect to each other and having varying intensities. Therefore, the polarization multiplexed light output from the polarization beam combiner 760 becomes time-interleaved polarization multiplexed light having a horizontal component and a vertical component staggered with respect to each other in terms of time (see FIG. 15).

As explained above, according to the polarization multiplexing and transmitting apparatus 700 of the third embodiment, use of the splitter 720 and, the optical dividers 731 and 732 to convert the continuous wave light into the two signal components having varying intensities enables generation of the respective signal components having varying intensities by using the single light source 710. When the continuous wave light is converted into the two signal components that are inverted with respect to each other and having varying intensities, the respective signal components having varying intensities can be staggered with respect each other in terms of time without using the delay adjustment circuit (see reference numeral 1750 in FIG. 17). Therefore, time-interleaved polarization multiplexing can be effected while reducing apparatus size.

When a bit rate of the clock signal is variable, the polarization multiplexed light to be output can have a variable bit rate. Here, since the respective signal components having varying intensities are output from the optical dividers 731 and 732 in a state in which they are always inverted with respect to each other, a temporal staggering of the respective signal components having varying intensities does not have to be adjusted according to a change in bit rate. Therefore, time-interleaved polarization multiplexing according to a variable bit rate can be performed with a simple configuration and control.

Figure 9:
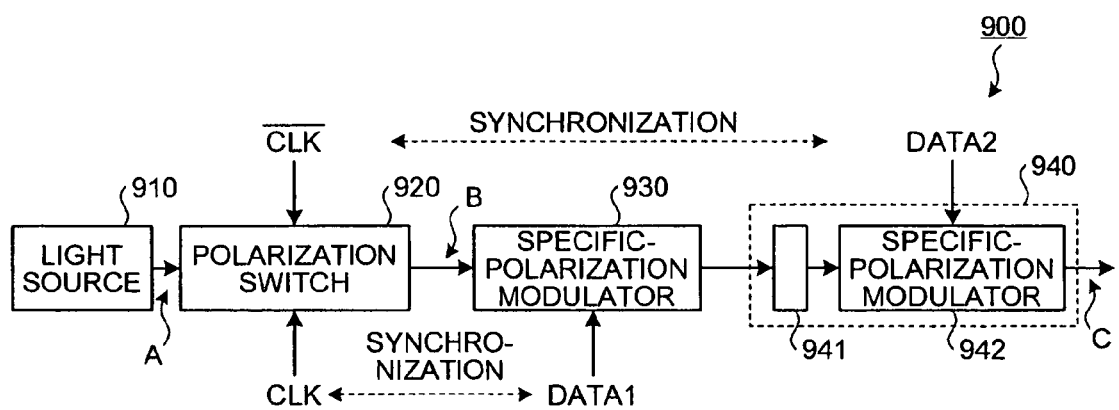
FIG. 9 is a block diagram of a polarization multiplexing and transmitting apparatus according to a fourth embodiment.

FIG. 9 is a block diagram of a polarization multiplexing and transmitting apparatus according to the fourth embodiment. As shown in FIG. 9, a polarization multiplexing and transmitting apparatus 900 according to the fourth embodiment includes a light source 910, a polarization switch 920, a specific-polarization modulator 930 (first modulating unit), and a specific-polarization modulator 940 (second modulating unit). The light source 910 is equivalent to the light source 110 depicted in FIG. 1. The light source 910 generates and outputs continuous wave light to the polarization switch 920 (reference character A).

The polarization switch 920 is equivalent to the converter 120 and the polarization adjuster 140 depicted in FIG. 1. The polarization switch 920 receives the continuous wave light output from the light source 910 and a clock signal. The polarization switch 920 changes a polarization direction of the continuous wave light output from the light source 910 to a horizontal direction and a vertical direction according to the input clock signal. The polarization switch 920 outputs the continuous wave light having the changed polarization direction to the specific-polarization modulator 930 (reference character B).

The polarization direction of the continuous wave light output from the polarization switch 920 is changed to the horizontal direction and the vertical direction according to the clock signal. Therefore, the continuous wave light output from the polarization switch 920 includes a horizontal component and a vertical component. Assuming that the polarization direction of the continuous wave light becomes horizontal when the clock signal is "1" and the polarization direction of the continuous wave light becomes vertical when the clock signal is "0", the horizontal component becomes a signal component having a varying intensity that is synchronized with the clock signal. The vertical component having the vertical polarization direction becomes a signal component having a varying intensity that is inversely synchronized with the clock signal.

The specific-polarization modulators 930 and 940 are equivalent to the modulator 130 depicted in FIG. 1. The specific-polarization modulator 930 receives the continuous wave light output from the polarization switch 920 and DATA1. The specific-polarization modulator 930, based on DATA1, modulates only the signal component having a varying intensity and a horizontal polarization direction in the continuous wave light output from the polarization switch 920. The specific-polarization modulator 930, in synchronization with the clock signal, modulates the signal component having a varying intensity.

The specific-polarization modulator 930 outputs, to the specific-polarization modulator 940, the continuous wave light including the signal component having a varying intensity and horizontal polarization direction. The specific-polarization modulator 940 receives the continuous wave light output from the specific-polarization modulator 930 and DATA2. The specific-polarization modulator 940, based on DATA2, modulates only the signal component having a varying intensity and vertical polarization direction in the continuous wave light output from the specific-polarization modulator 930. The specific-polarization modulator 940, in synchronization with an inverted clock signal obtained by inverting the clock signal, modulates the signal component having a varying intensity.

The specific-polarization modulator 940 outputs the continuous wave light that includes the modulated signal component having a varying intensity and a vertical polarization direction, to an external device (reference character C). Specifically, the specific-polarization modulator 940 may be formed of, for example, a λ/2 wave plate 941 and a specific-polarization modulator 942. The λ/2 wave plate 941 changes a linear polarization direction of the continuous wave light output from the specific-polarization modulator 930 by 90° for output to the specific-polarization modulator 942. As a result, the horizontal component and the vertical component included in the continuous wave light counterchange.

The specific-polarization modulator 942, in synchronization with the inverted clock signal, modulates only the signal component having a varying intensity and horizontal polarization direction in the continuous wave light output from the λ/2 wave plate 941. As a result, the specific-polarization modulator 930 can modulate the signal component having a varying intensity and horizontal polarization direction in the continuous wave light output from the polarization switch 920, and the specific-polarization modulator 940 can modulate the signal component having a varying intensity and vertical polarization direction in the continuous wave light output from the polarization switch 920.

A polarization maintaining fiber that changes the polarization direction of the continuous wave light output from the specific-polarization modulator 930 by 90° for output to the specific-polarization modulator 942 may be provided in place of the λ/2 wave plate 941. A specific-polarization modulator that, in synchronization with the inverted clock signal, modulates only the signal component having a varying intensity and vertical polarization direction in the continuous wave light output from the specific-polarization modulator 930 may be provided in place of the λ/2 wave plate 941 and the specific-polarization modulator 942.

In a general situation where a polarization state of the continuous wave light output from the specific-polarization modulator 930 is not linear polarization, the polarization state of the continuous wave light can be converted to establish an orthogonal state like the above example by inserting a birefringent element having an appropriate birefringence in place of the λ/2 wave plate 941.

DATA1 input to the specific-polarization modulator 930 may be split, and the split DATA1 may be subjected to appropriate amplitude/delay adjustment for input to the specific-polarization modulator 940. The specific-polarization modulator 940 compensates DATA2 using DATA1, and executes modulation based on the compensated DATA2. DATA2 input to the specific-polarization modulator 940 may be split, and the split DATA2 may be subjected to appropriate amplitude/delay adjustment for input to the specific-polarization modulator 930. The specific-polarization modulator 930 compensates DATA1 using DATA2, and executes modulation based on the compensated DATA1.

As a result, even if the vertical component is modulated based on DATA1 due to an error of the specific-polarization modulator 930, the specific-polarization modulator 940 compensates DATA2 using DATA1, to modulate the vertical component, thereby compensating the error. Further, even if the horizontal component is modulated based on DATA2 due to an error of the specific-polarization modulator 940, the specific-polarization modulator 930 compensates DATA2 using DATA1 in advance to modulate the horizontal component, thereby compensating the error.

Figure 10:
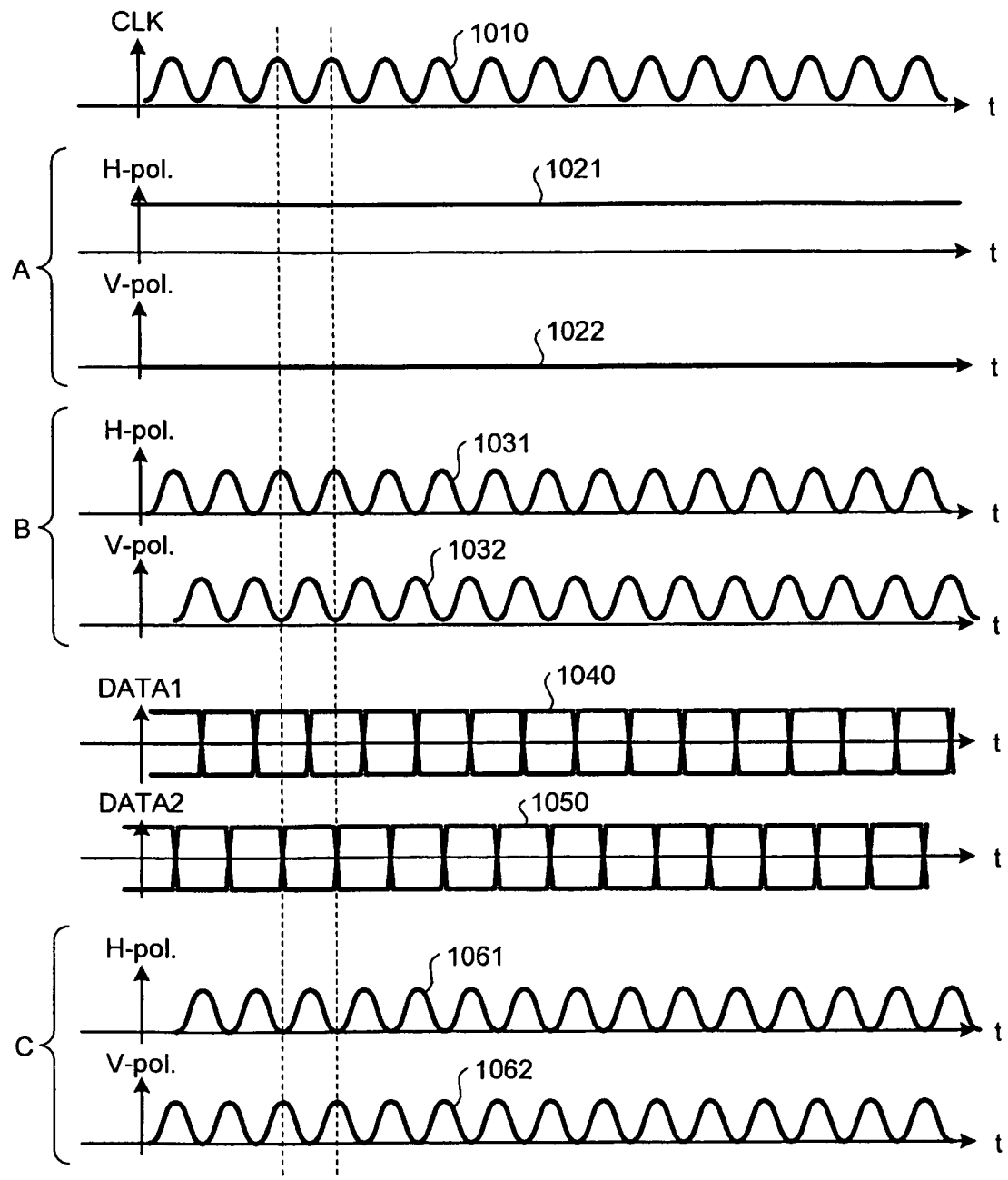
FIG. 10 is a time chart of the polarization multiplexing and transmitting apparatus according to the fourth embodiment.

FIG. 10 is a time chart of the polarization multiplexing and transmitting apparatus according to the fourth embodiment. In FIG. 10, an abscissa (t) represents a time common to lights or electrical signals at respective sections in the polarization multiplexing and transmitting apparatus 900 according to the fourth embodiment. A waveform 1010 represents the clock signal (CLK) input to the polarization switch 920. H-pol. of an ordinate indicates a horizontal component of a light. V-pol. indicates a vertical component of a light.

Reference character A denotes waveforms (1021 and 1022) of the continuous wave light (see reference character A in FIG. 9) output from the light source 910 to the polarization switch 920. The waveforms 1021 and 1022 respectively represent a horizontal and a vertical component of the continuous wave light output from the light source 910. As represented by the waveforms 1021 and 1022, the continuous wave light output from the light source 910 includes the horizontal component alone, i.e., does not include the vertical component.

Reference character B designates waveforms (1031 and 1032) of the continuous wave light (see reference character B in FIG. 9) output from the polarization switch 920 to the specific-polarization modulator 930. The waveform 1031 and the waveform 1032 represent a horizontal component and a vertical component of the continuous wave light output from the polarization switch 920, respectively. As represented by the waveforms 1031 and 1032, the continuous wave light output from the polarization switch 920 includes the signal component having a varying intensity that is synchronized with the clock signal (see reference numeral 1010) and the signal component having a varying intensity that is inversely synchronized with the clock signal.

A waveform 1040 represents a waveform of DATA1 input to the specific-polarization modulator 930. As represented by the waveform 1040, DATA1 is input to the specific-polarization modulator 930 in synchronization with the clock signal (see reference numeral 1010). A waveform 1050 represents a waveform of DATA2 input to the specific-polarization modulator 942. As represented by the waveform 1050, DATA2 is input to the specific-polarization modulator 942 in inverse-synchronization with the clock signal (see reference numeral 1010).

Reference character C denotes waveforms (1061 and 1062) of the polarization multiplexed light (see reference character C in FIG. 9) output from the specific-polarization modulator 942 to an external device. The waveforms 1061 and 1062 respectively represent a horizontal and a vertical component of the polarization multiplexed light output from the specific-polarization modulator 942.

As represented by the waveforms 1061 and 1062, the horizontal component and the vertical component of the polarization multiplexed light output from the specific-polarization modulator 940 to an external device become signal components having varying intensities that are inverted with respect to each other. Therefore, the polarization multiplexed light output from the specific-polarization modulator 942 becomes time-interleaved polarization multiplexed light having a horizontal component and a vertical component staggered with respect to each other in terms of time (see FIG. 15).

As explained above, according to the polarization multiplexing and transmitting apparatus 900 of the fourth embodiment, use of the polarization switch 920 to convert the continuous wave light into the two signal components having varying intensities enables generation of the respective signal components having varying intensities using the single light source 910. When the continuous wave light is converted into the two signal components having varying intensities that are inverted with respect to each other, the respective signal components having varying intensities can be temporally staggered with respect each other without using the delay adjustment circuit (see reference numeral 1750 in FIG. 17). Therefore, time-interleaved polarization multiplexing can be executed while reducing apparatus size.

When the continuous wave light is converted into the two signal components having varying intensities that are inverted with respect to each other, the continuous wave light can be converted into the two signal components having varying intensities without being attenuated. Therefore, the power consumed to obtain a necessary power of the polarization multiplexed light can be reduced. For instance, the polarization multiplexing and transmitting apparatus 900 can reduce power consumption by approximately half as compared with an example in which an optical divider attenuates the continuous wave light to be converted into the signal components having varying intensities.

When a bit rate of the clock signal is variable, the polarization multiplexed light to be output can have a variable bit rate. Here, since the specific-polarization modulator 940 outputs the respective signal components having varying intensities in a state such that these signal components are always inverted with respect to each other, a temporal staggering of the respective signal components having varying intensities does not have to be adjusted according to a change in bit rate. Therefore, time-interleaved polarization multiplexing according to a variable bit rate can be performed with a simple configuration and control.

Figure 11:
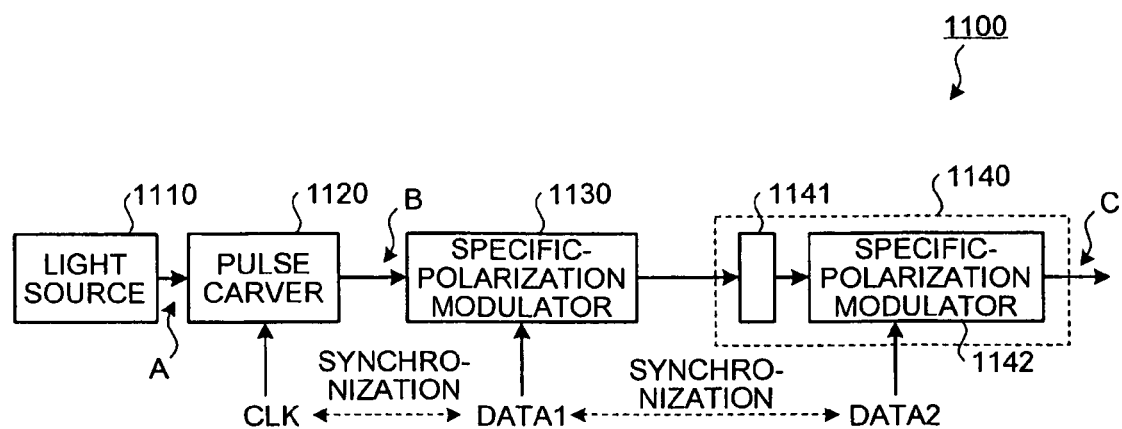
FIG. 11 is a block diagram of a polarization multiplexing and transmitting apparatus according to a fifth embodiment.

FIG. 11 is a block diagram of a polarization multiplexing and transmitting apparatus according to the fifth embodiment. As shown in FIG. 11, a polarization multiplexing and transmitting apparatus 1100 according to the fifth embodiment includes a light source 1110, an optical divider 1120, a specific-polarization modulator 1130, and a specific-polarization modulator 1140. The light source 1110 generates and outputs continuous wave light to the optical divider 1120 (reference character A).

The optical divider 1120 receives the continuous wave light output from the light source 1110 and a clock signal. The optical divider 1120 pulses the continuous wave light output from the light source 1110 according to the clock signal, thereby providing a signal component having a varying intensity that is synchronized with the clock signal. The optical divider 1120 outputs the pulsed signal component having a varying intensity to the specific-polarization modulator 1130.

Here, a polarization adjusting unit that adjusts a polarization direction of the signal component having a varying intensity output from the optical divider 1120 to a combined direction of a horizontal direction and a vertical direction is provided. For example, the polarization direction of the continuous wave light output from the light source 1110 is set to a direction deviating from the horizontal direction and the vertical direction at 45°. As a result, the signal component having a varying intensity output from the optical divider 1120 includes a light component whose polarization direction is a horizontal direction and a light component whose polarization direction is a vertical direction.

The specific-polarization modulators 1130 and 1140 are equivalent to the modulator 130 depicted in FIG. 1. The specific-polarization modulator 1130 receives the continuous wave light output from the optical divider 1120 and DATA1. The specific-polarization modulator 1130 modulates only a signal component having a varying intensity and a horizontal polarization direction in the continuous wave light output from the optical divider 1120, based on DATA1. The specific-polarization modulator 1130 modulates the signal component having a varying intensity in synchronization with the clock signal.

The specific-polarization modulator 1130 outputs the continuous wave light including the modulated signal component having a varying intensity and a horizontal polarization to the specific-polarization modulator 1140. The specific-polarization modulator 1140 receives the continuous wave light output from the specific-polarization modulator 1130 and DATA2. The specific-polarization modulator 1140 modulates only a signal component having a varying intensity and a vertical polarization direction in the continuous wave light output from the specific-polarization modulator 1130, based on DATA2. The specific-polarization modulator 1140, in synchronization with the clock signal, modulates the signal component having a varying intensity.

The specific-polarization modulator 1140 outputs the continuous wave light including the modulated signal component having a varying intensity and a vertical polarization direction to an external device (reference character C). The specific-polarization modulator 1140 includes a $\lambda/2$ wave plate 1141 and a specific-polarization modulator 1142 like the specific-polarization modulator 940 depicted in FIG. 9. The $\lambda/2$ wave plate 1141 changes a polarization direction of the continuous wave light output from the specific-polarization modulator 1130 by 90° and outputs this continuous wave light to the specific-polarization modulator 1142. As a result, the light component having a horizontal polarization direction and the light component having a vertical polarization direction included in the continuous wave light counterchange.

The specific-polarization modulator 1142, in synchronization with the clock signal, modulates only the signal component having a varying intensity and a horizontal polarization direction in the continuous wave light output from the $\lambda/2$ wave plate 1141. As a result, the specific-polarization modulator 1130 can modulate the signal component having a varying intensity and horizontal polarization direction in the continuous wave light output from the optical divider 1120, and the specific-polarization modulator 1140 can modulate the signal component with a varying intensity and vertical polarization direction in the continuous wave light output from the optical divider 1120.

A polarization maintaining fiber that changes the polarization direction of the continuous wave light output from the specific-polarization modulator 1130 by 90° for output to the specific-polarization modulator 1142 may be provided in place of the $\lambda/2$ wave plate 1141. A specific-polarization modulator that, in synchronization with an inverted clock signal, modulates only the signal component having a varying intensity and vertical polarization direction in the continuous wave light output from the specific-polarization modulator 1130 may be provided in place of the $\lambda/2$ wave plate 1141 and the specific-polarization modulator 1142.

DATA1 input to the specific-polarization modulator 1130 may be split, and the split DATA1 may be input to the specific-polarization modulator 1140. The specific-polarization modulator 1140 compensates DATA2 using DATA1, and executes modulation based on the compensated DATA2. DATA2 input to the specific-polarization modulator 1140 may be split, and the split DATA2 may be input to the specific-polarization modulator 1130. The specific-polarization modulator 1130 compensates DATA1 using DATA2, and executes modulation based on the compensated DATA1.

As a result, even if the vertical component is modulated based on DATA1 due to an error of the specific-polarization modulator 1130, the specific-polarization modulator 1140 can compensate DATA2 using DATA1, to modulate the vertical component, thereby compensating the error. Further, even if the horizontal component is modulated based on DATA2 due to an error of the specific-polarization modulator 1140, the specific-polarization modulator 1130 can compensate DATA1 using DATA2 in advance, to modulate the horizontal component, thereby compensating the error.

Figure 12:
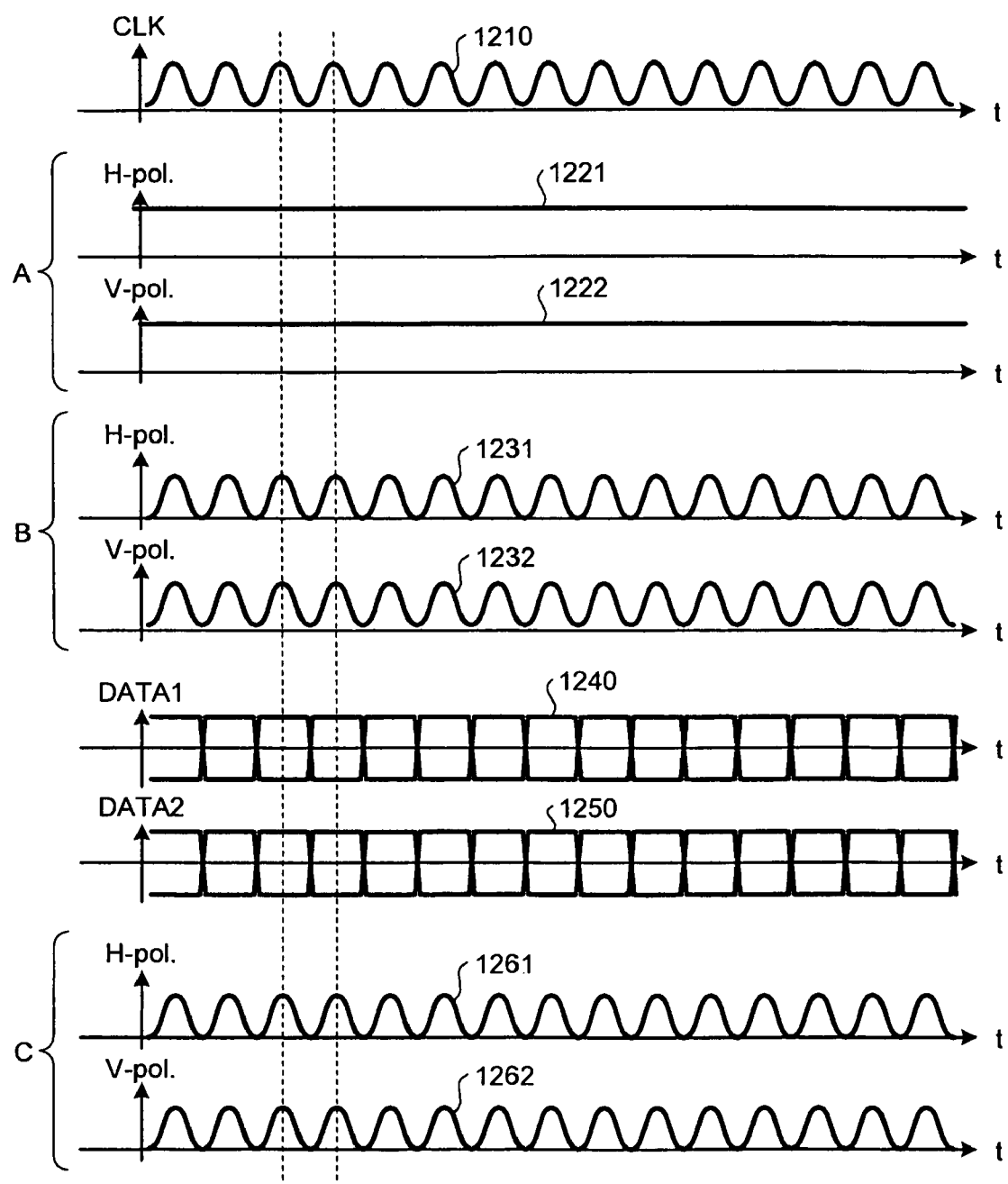
FIG. 12 is a view of a time chart of the polarization multiplexing and transmitting apparatus according to the fifth embodiment.

FIG. 12 is a view of a time chart of the polarization multiplexing and transmitting apparatus according to the fifth embodiment. In FIG. 12, an abscissa (t) represents a time common to light or electrical signals at respective sections in the polarization multiplexing and transmitting apparatus 1100 according to the fifth embodiment. A waveform 1210 represents the clock signal (CLK) input to the optical divider 1120. H-pol. of an ordinate indicates a horizontal component of a light. V-pol. indicates a vertical component of a light.

Reference character A denotes waveforms (1221 and 1222) of the continuous wave light (see reference character A in FIG. 11) output from the light source 1110 to the optical divider 1120. The waveform 1221 represents a horizontal component of the continuous wave light output from the light source 1110. The waveform 1222 represents a vertical component of the continuous wave light output from the light source 1110. As represented by the waveform 1221 and the waveform 1222, the continuous wave light output from the light source 1110 includes the horizontal component and the vertical component at substantially the same percentages.

Reference character B designates waveforms (1231 and 1232) of the continuous wave light (see reference character B in FIG. 11) output from the optical divider 1120 to the specific-polarization modulator 1130. The waveforms 1231 and 1232 represent a horizontal component and a vertical component of the continuous wave light output from the optical divider 1120. As represented by the waveform 1231 and the waveform 1232, the continuous wave light output from the optical divider 1120 becomes the signal component having a varying intensity that is synchronized with the clock signal (see reference numeral 1210).

A waveform 1240 represents a waveform of DATA1 input to the specific-polarization modulator 1130. A waveform 1250 represents a waveform of DATA2 input to the specific-polarization modulator 1142. As represented by the waveforms 1240 and 1250, both DATA1 input to the specific-polarization modulator 1130 and DATA2 input to the specific-polarization modulator 1142 are input in synchronization with the clock signal (see reference numeral 1210).

Reference character C denotes waveforms (1261 and 1262) of the polarization multiplexed light (see reference character C in FIG. 11) output from the specific-polarization modulator 1142 to the external device. The waveform 1261 represents a horizontal component of the polarization multiplexed light output from the specific-polarization modulator 1142. The waveform 1262 represents a vertical component of the polarization multiplexed light output from the specific-polarization modulator 1142.

As represented by the waveforms 1261 and 1262, the horizontal component and the vertical component of the polarization multiplexed light output from the specific-polarization modulator 1142 to external unit become the signal components having varying intensities that are synchronized with each other. Therefore, the polarization multiplexed light output from the specific-polarization modulator 1142 becomes time-aligned polarization multiplexed light having a horizontal component and a vertical component that are synchronized with each other (see FIG. 14).

As explained above, according to the polarization multiplexing and transmitting apparatus 1100 of the fifth embodiment, use of the optical divider 1120 to convert the continuous wave light into the two signal components having varying intensities enables generation of the respective signal components having varying intensities by using the single light source 1110. Therefore, time-aligned polarization multiplexing can be executed while reducing apparatus size.

Figure 13:
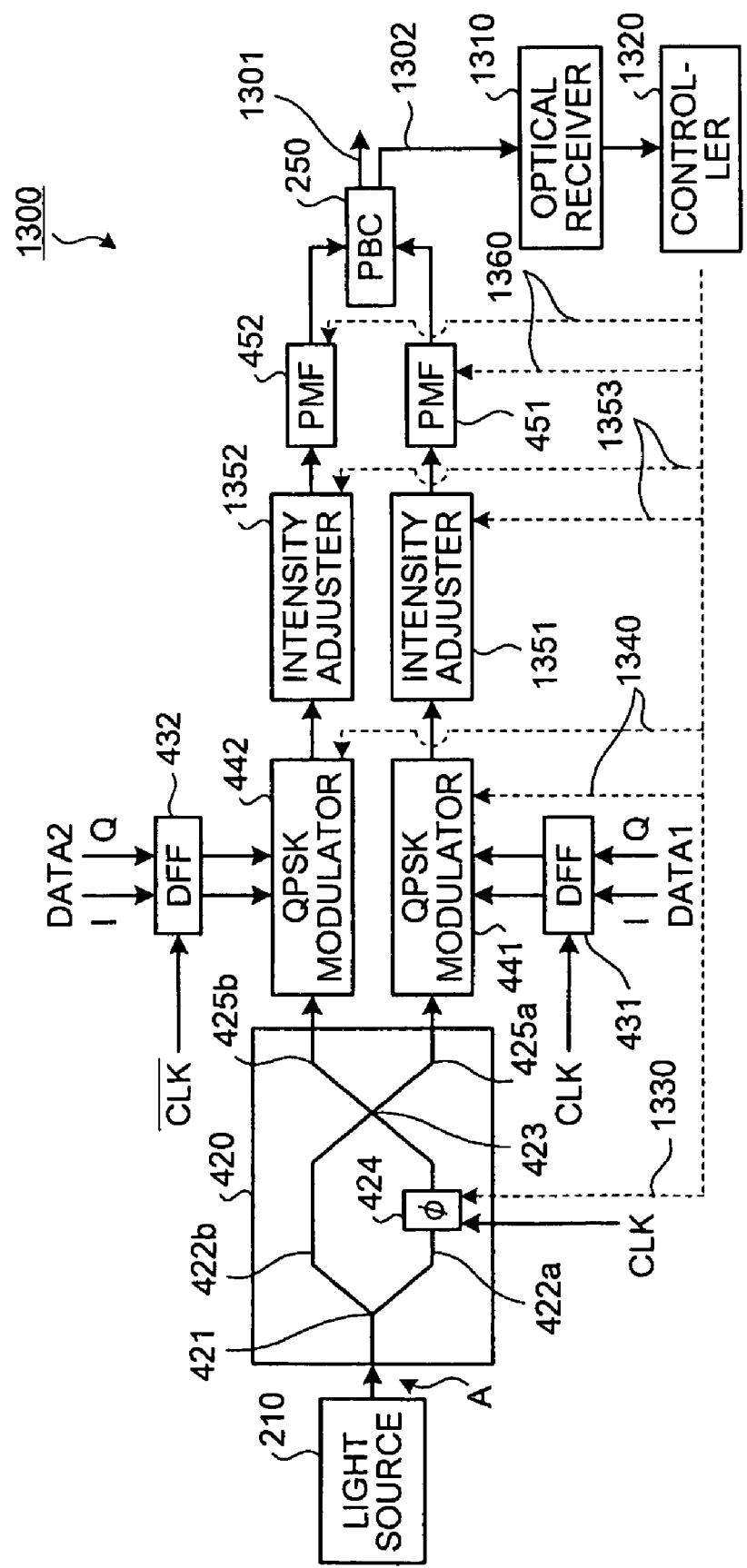
FIG. 13 is a block diagram of a polarization multiplexing and transmitting apparatus according to a sixth embodiment.

FIG. 13 is a block diagram of a polarization multiplexing and transmitting apparatus according to the sixth embodiment. In FIG. 13, like reference numerals denote structures identical to those in the polarization multiplexing and transmitting apparatus 400 depicted in FIG. 4, thereby omitting an explanation thereof. In FIG. 13, the clock oscillator 410 and the inverting circuit 411 depicted in FIG. 4 are omitted.

As shown in FIG. 13, a polarization multiplexing and transmitting apparatus 1300 according to the sixth embodiment includes an optical receiver 1310 and a controller 1320 in addition to the structures in the polarization multiplexing and transmitting apparatus 400 depicted in FIG. 4. Polarization maintaining fibers 451 and 452 output respective signal components having varying intensities output from a phase modulator 441 and a phase modulator 442 to a polarization beam combiner 250 in a state in which all of a first to a fourth later-explained input unique polarization state components of the polarization beam combiner 250 are excited.

The polarization beam combiner 250 has two output units (output units 1301 and 1302) that output coupled light to an external device. The polarization beam combiner 250 outputs a given polarization state (first input unique polarization state) component in coupled light to the output unit 1301 from the polarization maintaining fiber 451, and also outputs a second input unique polarization state component orthogonal to the first input unique polarization state component to the output unit 1302. The polarization beam combiner 250 outputs a given polarization state (third input unique polarization state) component in coupled light from the polarization maintaining fiber 452 to the output unit 1301, and also outputs a fourth input unique polarization state component orthogonal to the third input unique polarization state component to the output unit 1302. At this time, the output unit 1301 outputs a combination of the first input unique polarization state component and the third input unique polarization state component in polarization states orthogonal to each other, and the output unit 1302 outputs a combination of the second input unique polarization state component and the fourth input unique polarization state component in polarization states orthogonal to each other as a monitor light.

The optical receiver 1310 is a monitoring unit that receives the monitor light output from the output unit 1302 in the polarization beam combiner 250 for conversion into an electrical signal. The optical receiver 1310 outputs the converted electrical signal to the controller 1320. The optical receiver 1310 is, for example, a photo diode. The controller 1320, based on the electrical signal output from the optical receiver 1310, performs adjustment control over each section provided upstream from the polarization beam combiner 250.

For example, as indicated by reference numeral 1330, the controller 1320, based on the electrical signal output from the optical receiver 1310, controls a bias supplied to a phase shifter 424 of an optical switch 420. As a result, auto bias control that adjusts an extinction ratio in a coupler 423 can be performed.

As indicated by a reference numeral 1340, the controller 1320 may control respective signals supplied to the phase modulators 441 and 442 to adjust modulation characteristics based on the electrical signal output from the optical receiver 1310. For example, the controller 1320 performs auto bias control that controls a bias supplied to a λ/2 phase shifter (not depicted) of the phase modulator 441 and the phase modulator 442 to adjust an extinction ratio of the phase modulator 441 and the phase modulator 442.

The polarization multiplexing and transmitting apparatus 1300 may include an intensity adjuster 1351 that adjusts an intensity of a signal component having a varying intensity output from the phase modulator 441 to the polarization maintaining fiber 451 and an intensity adjuster 1352 that adjusts an intensity of a signal component having a varying intensity output from the phase modulator 442 to the polarization maintaining fiber 452. Each of the intensity adjusters 1351 and 1352 is, for example, an optical amplifier or an optical attenuator.

In this case, as indicated by reference numeral 1353, the controller 1320 executes auto power control that, based on the electrical signal output from the optical receiver 1310, controls the intensity adjusters 1351 and 1352 to adjust intensities of respective signal components having varying intensities and output to the polarization maintaining fibers 451 and 452.

For example, as indicated by reference numeral 1360, the controller 1320 may control torsion angles of the polarization maintaining fibers 451 and 452 to adjust polarization directions of respective signal components having varying intensities and output to the polarization beam combiner 250. This enables adjustment of a ratio of the signal component having a varying intensity output from the output unit 1301 and the monitor light output from the output unit 1302 as light to be coupled by the polarization beam combiner 250.

As explained above, according to the polarization multiplexing and transmitting apparatus 1300 of the sixth embodiment, the effect of the polarization multiplexing and transmitting apparatus 400 according to the first embodiment can be demonstrated, and using the polarization beam combiner having two inputs and two outputs as the polarization beam combiner 250 enables extraction of the monitor light without providing a splitter, e.g., an optical coupler. Thereby apparatus size can be reduced when adjustment of each section in the polarization multiplexing and transmitting apparatus 1300 is performed based on feedback control.

The example in which the sixth embodiment is applied to the configuration of the polarization multiplexing and transmitting apparatus 400 depicted in FIG. 4 is explained; however, the sixth embodiment can be applied to the respective polarization multiplexing and transmitting apparatuses according to the first to the third embodiments. Specifically, the polarization beam combiner having two inputs and two outputs is used as the polarization beam combiner in each of the polarization multiplexing and transmitting apparatuses according to the first to the third embodiments, and the optical receiver 1310, the controller 1320, and the intensity adjusters 1351 and 1352 are provided.

As explained above, according to the polarization multiplexing and transmitting apparatus of the present invention, time-interleaved polarization multiplexing can be effected while reducing apparatus size.

Figure 14:
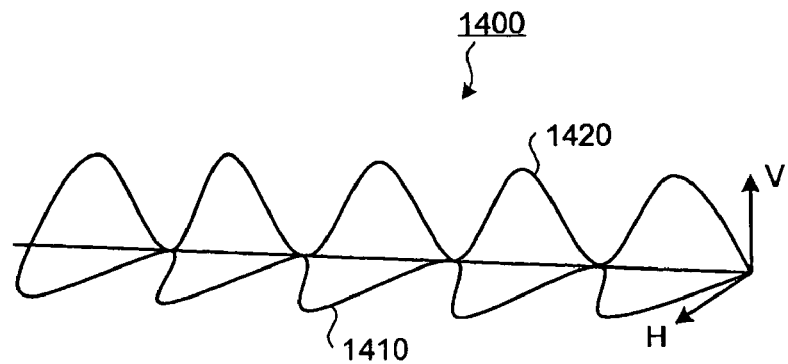
FIG. 14 is a conceptual view of light subjected to polarization multiplexing.

The configuration in which the polarization multiplexing and transmitting apparatus is used to perform time-interleaved polarization multiplexing is explained in each of the foregoing embodiments; however the delay adjustment circuit (see reference numeral 1750 in FIG. 17) that delays one of respective signal components having varying intensities may be further provided to synchronize the respective signal components having varying intensities with each other, thereby performing time-aligned polarization multiplexing (see reference numeral 1400 in FIG. 14).

In this case, conversion of the continuous wave light into the two signal components having varying intensities enables production of the respective signal components having varying intensities by using the single light source. Therefore, time-aligned polarization multiplexing can be performed while reducing apparatus size. When the continuous wave light is separated into the two signal components having varying intensities that are inverted with respect to each other, the continuous wave light can be converted into the two signal components having varying intensities without being attenuated. Therefore, the power consumed to obtain a necessary power of the polarization multiplexed light can be reduced.

According to the embodiments described above, a polarization multiplexing and transmitting apparatus realizes time-interleaved polarization multiplexing while achieving a reduction in apparatus size.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A polarization multiplexing and transmitting apparatus comprising:
   a converter that converts light generated by a light source into signal components having a varying intensity synchronized with a clock signal input thereto and a varying intensity inversely synchronized with the clock signal, respectively;
   a signal component modulator that modulates the signal components, respectively; and
   a polarization adjuster that orthogonalizes polarization states of the signal components, wherein the signal component modulator includes
   a first modulator that performs data modulation with respect to one of the signal components based on a first data signal and the clock signal, and
   a second modulator that performs data modulation with respect to the other of the signal components based on a second data signal and an inverted clock signal that is the clock signal inverted.

2. The polarization multiplexing and transmitting apparatus according to claim 1, wherein the first modulator and the second modulator temporally stagger the signal components that are in the polarization states orthogonalized by the polarization adjuster, by an amount corresponding to a half of a pulse repetition period thereof and output the signal components.

3. The polarization multiplexing and transmitting apparatus according to claim 1, further comprising a polarization multiplexer that performs polarization multiplexing with respect to the signal components respectively modulated by the signal component modulator and in the polarization states orthogonalized by the polarization adjuster, wherein
   the converter is an optical switch that switches the light to a first path or a second path at a rate according to the clock signal to convert the light into the signal components.

4. The polarization multiplexing and transmitting apparatus according to claim 3, wherein the optical switch includes
   a splitter that splits the light,
   parallel waveguides that transmit the light split by the splitter, a phase shifter that, according to the clock signal, changes a phase of the light passing through one of the parallel waveguides, and a coupling unit that couples the light respectively passing through the parallel waveguides and distributes the light coupled thereby to the first path or the second path at a rate according to interference conditions.

5. The polarization multiplexing and transmitting apparatus according to claim 3 wherein the polarization multiplexer is a polarization beam combiner that couples the signal components that are modulated by the signal component modulator and have the polarization states orthogonalized by the polarization adjuster.

6. The polarization multiplexing and transmitting apparatus according to claim 5, wherein the polarization beam combiner includes a first input unit, a second input unit, a first output unit, and a second output unit, the first input unit and the second input unit being complementary to the first output unit and the second output unit, the first input unit guides a first unique polarization state component to the first output unit and a second unique polarization state component to the second output unit, the second input unit guides a third unique polarization state component to the first output unit and a fourth unique polarization state component to the second output unit, the polarization adjuster adjusts the polarization states of the signal components such that the first to the fourth unique polarization states become excited with an amplitude that is not 0, and the polarization multiplexing and transmitting apparatus further includes a monitoring unit that monitors a monitoring light output from the second output unit.

7. The polarization multiplexing and transmitting apparatus according to claim 6, further comprising a control unit that controls setting adjustments upstream from the polarization multiplexer based on a monitoring result of the monitoring unit.

8. The polarization multiplexing and transmitting apparatus according to claim 1, wherein the converter and the polarization adjuster include a polarization switch that, according to the clock signal, changes a polarization state of the light to a first polarization state and a second polarization state orthogonal to the first polarization state, and a polarization beam splitter that separates the light having the polarization state changed by the polarization switch into the signal components that are in the first polarization state and the second polarization state, respectively, and the polarization multiplexing and transmitting apparatus further comprises a polarization multiplexer that performs polarization multiplexing with respect to the signal components separated by the polarization beam splitter and modulated by the signal component modulator.

9. The polarization multiplexing and transmitting apparatus according to claim 8, wherein the polarization multiplexer is a polarization beam combiner that couples the signal components that are modulated by the signal component modulator and have the polarization states orthogonalized by the polarization adjuster.

10. The polarization multiplexing and transmitting apparatus according to claim 9, wherein the polarization beam combiner includes a first input unit, a second input unit, a first output unit, and a second output unit, the first input unit and the second input unit being complementary to the first output unit and the second output unit, the first input unit guides a first unique polarization state component to the first output unit and a second unique polarization state component to the second output unit, the second input unit guides a third unique polarization state component to the first output unit and a fourth unique polarization state component to the second output unit, the polarization adjuster adjusts the polarization states of the signal components such that the first to the fourth unique polarization states become excited with an amplitude that is not 0, and the polarization multiplexing and transmitting apparatus further includes a monitoring unit that monitors a monitoring light output from the second output unit.

11. The polarization multiplexing and transmitting apparatus according to claim 10, further comprising a control unit that controls setting adjustments upstream from the polarization multiplexer based on a monitoring result of the monitoring unit.

12. The polarization multiplexing and transmitting apparatus according to claim 1, further comprising a polarization multiplexer that performs polarization multiplexing with respect to the signal components that are respectively modulated by the signal component modulator and in the polarization states orthogonalized by the polarization adjuster, wherein the converter includes a splitter that splits the light into a first light component and a second light component for output to a first path and a second path, and a pulsing unit that pulses the first light component in synchronization with the clock signal and pulses the second light component in inverse-synchronization with the clock signal.

13. The polarization multiplexing and transmitting apparatus according to claim 12, wherein the polarization multiplexer is a polarization beam combiner that couples the signal components that are modulated by the signal component modulator and have the polarization states orthogonalized by the polarization adjuster.

14. The polarization multiplexing and transmitting apparatus according to claim 13, wherein the polarization beam combiner includes a first input unit, a second input unit, a first output unit, and a second output unit, the first input unit and the second input unit being complementary to the first output unit and the second output unit, the first input unit guides a first unique polarization state component to the first output unit and a second unique polarization state component to the second output unit, the second input unit guides a third unique polarization state component to the first output unit and a fourth unique polarization state component to the second output unit, the polarization adjuster adjusts the polarization states of the signal components such that the first to the fourth unique polarization states become excited with an amplitude that is not 0, and the polarization multiplexing and transmitting apparatus further includes a monitoring unit that monitors a monitoring light output from the second output unit.

15. The polarization multiplexing and transmitting apparatus according to claim 14, further comprising a control unit that controls setting adjustments upstream from the polarization multiplexer based on a monitoring result of the monitoring unit.

16. The polarization multiplexing and transmitting apparatus according to claim 1, wherein the converter and the polarization adjuster are a polarization switch that, according to the clock signal, changes a polarization state of the light to a first polarization state and a second polarization state orthogonal to the first polarization state, and the polarization multiplexing and transmitting apparatus further comprises:
- a first signal component modulator that modulates a signal component in the first polarization state among the signal components; and
- a second signal component modulator that is connected with the first signal component modulator in series and modulates a signal component in the second polarization state among the signal components.

17. The polarization multiplexing and transmitting apparatus according to claim 16, wherein the second signal component modulator includes
- a birefringent element that changes the polarization state of the light modulated by the first signal component modulator to the second polarization state, the light being polarization multiplexed light, and
- a modulator that modulates the signal component in the first polarization state included in the polarization multiplexed light that has passed through the birefringent element.

18. The polarization multiplexing and transmitting apparatus according to claim 16, wherein
the first signal component modulator compensates a first data signal using a second data signal and modulates based on the first data signal compensated thereby, and
the second signal component modulator compensates the second data signal using the first data signal and modulates based on the second data signal compensated thereby.

19. The polarization multiplexing and transmitting apparatus according to claim 1, further comprising a delay adjusting unit that delays one of the signal components with respect to the other of the signal components and synchronizes the signal components with each other.

20. A polarization multiplexing and transmitting apparatus comprising:
- an optical switch that switches light generated by a light source to a first path or a second path at a rate according to a clock signal input thereto to convert the light into signal components having varying intensities that are inverted with respect to each other;
- a signal component modulator that modulates the signal components;
- a polarization adjuster that orthogonalizes polarization states of the signal components; and
- a polarization multiplexer that performs polarization multiplexing with respect to the signal components modulated by the signal component modulator and having the polarization states orthogonalized by the polarization adjuster.

* * * * *